(12) United States Patent
Russell et al.

(10) Patent No.: US 6,856,600 B1
(45) Date of Patent: Feb. 15, 2005

(54) METHOD AND APPARATUS FOR ISOLATING FAULTS IN A SWITCHING MATRIX

(75) Inventors: Ronald Alan Russell, Allen, TX (US); Michael Kevin Anthony, Little Elm, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/477,217

(22) Filed: Jan. 4, 2000

(51) Int. Cl.$^7$ .............................................. G06F 11/00
(52) U.S. Cl. ........................ 370/244; 370/217; 370/225; 398/6; 398/10
(58) Field of Search .................... 370/216–226, 370/241–252; 714/100, 31, 43, 47–48, 799, 701, 758, 798; 359/341.44; 375/240.27; 398/1–46

(56) References Cited

U.S. PATENT DOCUMENTS

| | | | | |
|---|---|---|---|---|
| 5,446,725 A | * | 8/1995 | Ishiwatari | 370/222 |
| 5,453,990 A | * | 9/1995 | Aoki et al. | 714/712 |
| 5,457,556 A | * | 10/1995 | Shiragaki | 398/50 |
| 5,459,718 A | * | 10/1995 | Kusano | 370/217 |
| 5,610,928 A | * | 3/1997 | Maddern et al. | 714/752 |
| 5,917,426 A | * | 6/1999 | Yoshifuji | 340/2.26 |
| 5,991,270 A | * | 11/1999 | Zwan et al. | 370/249 |
| 6,088,329 A | * | 7/2000 | Lindberg et al. | 370/217 |
| 6,145,024 A | * | 11/2000 | Maezawa et al. | 710/14 |
| 6,208,667 B1 | * | 3/2001 | Caldara et al. | 370/503 |
| 6,246,665 B1 | * | 6/2001 | Watanabe et al. | 370/218 |
| 6,262,820 B1 | * | 7/2001 | Al-Salameh | 359/119 |
| 6,307,653 B1 | * | 10/2001 | Bala et al. | 359/110 |
| 6,600,581 B1 | * | 7/2003 | Fatehi et al. | 398/9 |
| 6,674,714 B1 | * | 1/2004 | Mochizuki et al. | 370/217 |

OTHER PUBLICATIONS

Ali Saleh; H. Michael Zadikian; Zareh Baghdasarian, Vahid Parsi, "A Method For Routing Information Over A Network", filed Jan. 15, 1999; Ser. No. 09/232,397.

H. Michael Zadikian; Steven E. Plote, John C. Adler, David Parish Autry, Ali Saleh, "Method of Providing Network Services", filed Jan. 4, 2000; Ser. No. 09/477,498.

Ali Saleh, "A Method For Path Selection In A Network", filed Jan. 4, 2000; Ser. No. 09/478,235.

Ali N. Saleh and Stevan E. Plote, "A Network Addressing Scheme For Reducing Protocol Overhead In An Optical Network", filed Sep. 2, 1999; Ser. No. 09/389,302.

Ali Saleh, H. Michael Zadikian; John C. Adler, Zareh Baghdasarian, Vahid Parsi, "Configurable Network Router", filed Jan. 15, 1999; Ser. No. 09/232,395.

(List continued on next page.)

*Primary Examiner*—Dang Ton
*Assistant Examiner*—Tri H. Phan
(74) *Attorney, Agent, or Firm*—Campbell Stephenson Ascolese LP

(57) ABSTRACT

A signal router is described. The signal router includes a switching matrix, an error detector and a controller. The switching matrix includes a first number of inputs and a second number of outputs, and is configured to receive an information stream. The error detector is coupled to one of the second number of outputs, and is configured to generate error information by virtue of being configured to detect errors in the information stream. Likewise, the controller is coupled to the switching matrix and error detector. The controller is configured to select one of the first number of inputs, receive error information from the error detector, and configure the switching matrix to couple the selected input to one of the outputs.

38 Claims, 20 Drawing Sheets

OTHER PUBLICATIONS

Ali N. Saleh, Douglas E. Duschatko, Lane Byron Quibodeaux, "Method And Apparatus For A Rearrangeably Non–Blocking Switching Matrix", filed Jan. 4, 2000; Ser. No. 09/477,166.

H. Michael Zadikian, Ali Saleh; John C. Adler, Zareh Baghdasarian, Vahid Parsi, "A Resource Management Protocol For A Configurable Network Router", filed Jan. 4, 2000; Ser. No. 60/174,323.

H. Michael Zadikian, Ali Saleh, John C. Adler, Zareh Baghdasarian, Vahid Parsi, "A Method of Allocating Bandwidth in an Optical Network" (as amended), filed Jan. 15, 1999, Ser. No. 09/232,396.

* cited by examiner

METHOD AND APPARATUS FOR ISOLATING FAULTS IN A SWITCHING MATRIX

CROSS-REFERENCES TO RELATED APPLICATIONS

This application is related to patent application Ser. No. 09/232,397, filed Jan. 15, 1999, and entitled "A METHOD FOR ROUTING INFORMATION OVER A NETWORK," having A. N. Saleh, H. M. Zadikian, Z. Baghdasarian and V. Parsi as inventors; patent application Ser. No. 09/232,395, filed Jan. 15, 1999, now abandoned and entitled "A CONFIGURABLE NETWORK ROUTER," having H. M. Zadikian, A. N. Saleh, J. C. Adler, Z. Baghdasarian, and V. Parsi as inventors; patent application Ser. No. 09/232,396, filed Jan. 15, 1999 and entitled "METHOD OF ALLOCATING BANDWIDTH IN AN OPTICAL NETWORK," having H. M. Zadikian, A. Saleh, J. C. Adler, Z. Baghdasarian, and V. Parsi as inventors; patent application Ser. No. 06/174, 323, now U.S. Pat. No. 4,438,492, filed Jan. 4, 2000, and entitled "A RESOURCE MANAGEMENT PROTOCOL FOR A CONFIGURABLE NETWORK ROUTER" having H. M. Zadikian, A. Saleih, J. C. Adler, Z. Baghdasarian and Vahid Parsi as inventors; patent application Ser. No. 09/477, 166, filed herein Jan. 4, 2000, and entitled "METHOD AND APPARATUS FOR A REARRANGEABLY NON-BLOCKING SWITCHING MATRIX," having A. N. Saleh, D. Duschatko and L. B. Quibodeaux as inventors; patent application -Ser. No. 09/389,302, filed Sep. 2, 1999, and entitled "NETWORK ADDRESSING SCHEME FOR REDUCING PROTOCOL OVERHEAD IN AN OPTICAL NETWORK," having A. Saleh and S. E. Plote as inventors; patent application Ser. No. 09/478,235, filed Jan. 4, 2000, and entitled "A METHOD FOR PATH SELECTION IN A NETWORK," having A. Saleh as inventor; patent application Ser. No. 09/477,498, filed Jan. 4, 2000, and entitled "METHOD OF PROVIDING NETWORK SERVICES," having H. M. Zadikian, S. E. Plote, J. C. Adler, D. P. Autry, and A. Salch as inventors. These related applications are hereby incorporated by reference, in their entirely and for all purposes.

BACKGROUND OF THE INVENTION

1. Field of the Invention

This invention relates to the field of information networks, and more particularly relates to a router capable of routing information over a network.

2. Description of the Related Art

Today's networks carry vast amounts of information. High bandwidth applications supported by these networks include streaming video, streaming audio, and large aggregations of voice traffic. In the future, these demands are certain to increase. To meet such demands, an increasingly popular alternative is the use of lightwave communications carried over fiber optic cables. The use of lightwave communications provides several benefits, including high bandwidth, ease of installation, and capacity for future growth.

The synchronous optical network (SONET) protocol is among those protocols designed to employ an optical infrastructure and is widely employed in voice and data communications networks. SONET is a physical transmission vehicle capable of transmission speeds in the multi-gigabit range, and is defined by a set of electrical as well as optical standards. SONET networks have traditionally been protected from failures by using topologies that support fast restoration in the event of network failures. Their fast restoration time makes most failures transparent to the end-user, which is important in applications such as telephony and other voice communications. Existing schemes rely on techniques such as 1-plus-1 and 1-for-1 topologies that carry active traffic over two separate fibers (line switched) or signals (path switched), and use a protocol (Automatic Protection Switching or APS), or hardware (diverse protection) to detect, propagate, and restore failures.

In routing the large amounts of information between the nodes of an optical network, it is desirable to have a fast, efficient method for finding the most preferable path through that network. For example, in the case of voice communications, the failure of a link or node can disrupt a large number of voice circuits. The detection of such faults and the restoration of information flow must often occur very quickly to avoid noticeable interruption of such services. For most telephony implementations, for example, failures must be detected within about 10 ms and restoration must occur within about 50 ms. The short restoration time is critical in supporting applications, such as current telephone networks, that are sensitive to quality of service (QoS) because such detection and restoration times prevent old digital terminals and switches from generating alarms (e.g., initiating Carrier Group Alarms (CGAs)). Such alarms are undesirable because they usually result in dropped calls, causing users down time and aggravation. Restoration times exceeding 10 seconds can lead to timeouts at higher protocol layers, while those that exceed 1 minute can lead to disastrous results for the entire network.

In a SONET network, a failure of a given link results in a loss of signal (LOS) condition at the nodes connected by that link (per Belicore's recommendations in GR-253 (GR-253: *Synchronous Optical Network* (SONET) *Transport Systems*, Common Generic Criteria, Issue 2 [Bellcore, December 1995], included herein by reference, in its entirety and for all purposes)). The LOS condition propagated an Alarm Indication Signal (AIS) downstream, and Remote Defect Indication (RDI) upstream (if the path still exists), and an LOS defect locally. The defect is upgraded to a failure 2.5 seconds later, which causes an alarm to be sent to the Operations System (OS) (per GR-253). When using SONET, the handling of the LOS condition should follow Bellcore's recommendations in GR-253 (e.g., 3 ms following a failure, an LOS defect is detected and restoration should be initiated). This allows nodes to inter-operate, and co-exist, with other network equipment WE) in the same network. The arrival of the AIS at a node causes the node to send a similar alarm to its neighbor and for that node to send an AIS to its own neighbor, and so on. Under GR-253, each node is allowed only a certain amount of time in which to forward the AIS, and so quickly propagate the indication of a failure.

As can be seen, a network element in such environments must be able to quickly detect and address failures such as those discussed above. To enable the detection, and so correction, of such failures, it is desirable to provide the ability to monitor the operation of the network element, without detrimentally affecting the network element's operation. Also desirable is the ability to predict the occurrence of failures, so that corrective action may be taken in advance of any failures that might occur.

SUMMARY OF THE INVENTION

In one embodiment of the present invention, a signal router is described. The signal router includes a switching matrix, an error detector and a controller. The switching matrix includes a first number of inputs and a second number of outputs, and is configured to receive an information stream. The error detector is coupled to one of the second number of outputs, and is configured to generate error information by virtue of being configured to detect errors in the information stream. Likewise, the controller is coupled to the switching matrix and error detector. The controller is configured to select one of the first number of inputs, receive error information from the error detector, and configure the switching matrix to couple the selected input to one of the outputs.

In one aspect of this embodiment, the signal router includes number of error detectors. In this aspect, each of a number of switching matrices within the signal router is coupled to a corresponding error detector. If one of the switching matrixes experiences a failure, the failure is detected by a corresponding error detector. The switching matrix is configured to identify the failed switching matrix by virtue of error information generated by the corresponding error detector.

In another aspect of this embodiment, the information stream includes a number of frames. In this aspect, the error detector includes an error checker and a framing circuit. The error checker is coupled to the switching matrix and the controller, while the framing circuit is coupled to the switching matrix, the controller and the error checker. The error checker is configured to generate error check information, which is included in the error information. For example, each frame may contains an error check entry, and the error checker may generate error check information by analyzing one of the frames and comparing a result of said analyzing to an error check entry of another frame. The framing circuit is configured to detect a start-of-frame condition for each frame, indicate the start-of-frame condition to the error checker, detect an end-of-frame condition for each frame, indicate the end-of-frame condition to the error checker, and detect framing error. As with the error check information, the framing error is included in the error information.

In another embodiment of the present invention, an error detection method is disclosed. The error detection method includes sending a first command to a controller, generating error information and retrieving the error information. The controller is coupled to control a switching matrix and to an error detector. The command causes the controller to configure the switching matrix to couple one of a number of inputs to one of a number of outputs. The selected input is configured to receive an information stream, while the selected output is coupled to the error detector. The error information is generated by detecting errors, if any, in the information stream using the error detector. Once the errors have been detected and the error information generated, the error information is retrieved from the error detector using the controller.

In one aspect of this embodiment, the information stream includes a number of frames. In this aspect, the framing circuit is coupled to and provides framing information to an error checker of the error detector. The detection of errors includes generating framing errors and check errors in the appropriate circumstances. A framing error is generated if a farming circuit of the error detector detects an error in framing in the information stream. If no framing error is detected, a check error is generated for each erroneous frame that is processed by the error detector, an erroneous frame being a frame in which the error checker detects an error within the frame.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

In addition, the following detailed description has been divided into sections, subsections, and so on, in order to highlight the various subsystems of the invention described herein; however, those skilled in the art will appreciate that such sections are merely for illustrative focus, and that the invention herein disclosed typically draws its support from multiple sections. Consequently, it is to be understood that the division of the detailed description into separate sections is merely done as an aid to understanding and is in no way intended to be limiting.

Figure 1A:
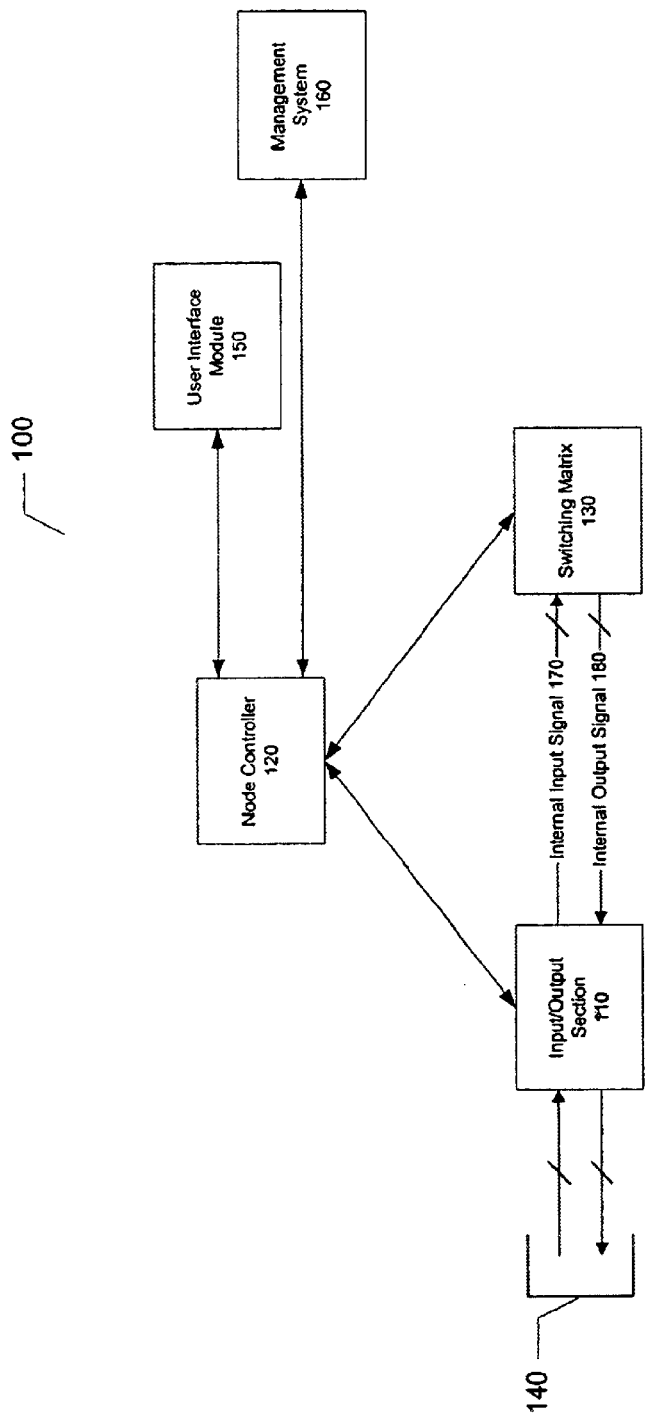
FIG. 1A is a block diagram of an exemplary router.
Figure 1B:
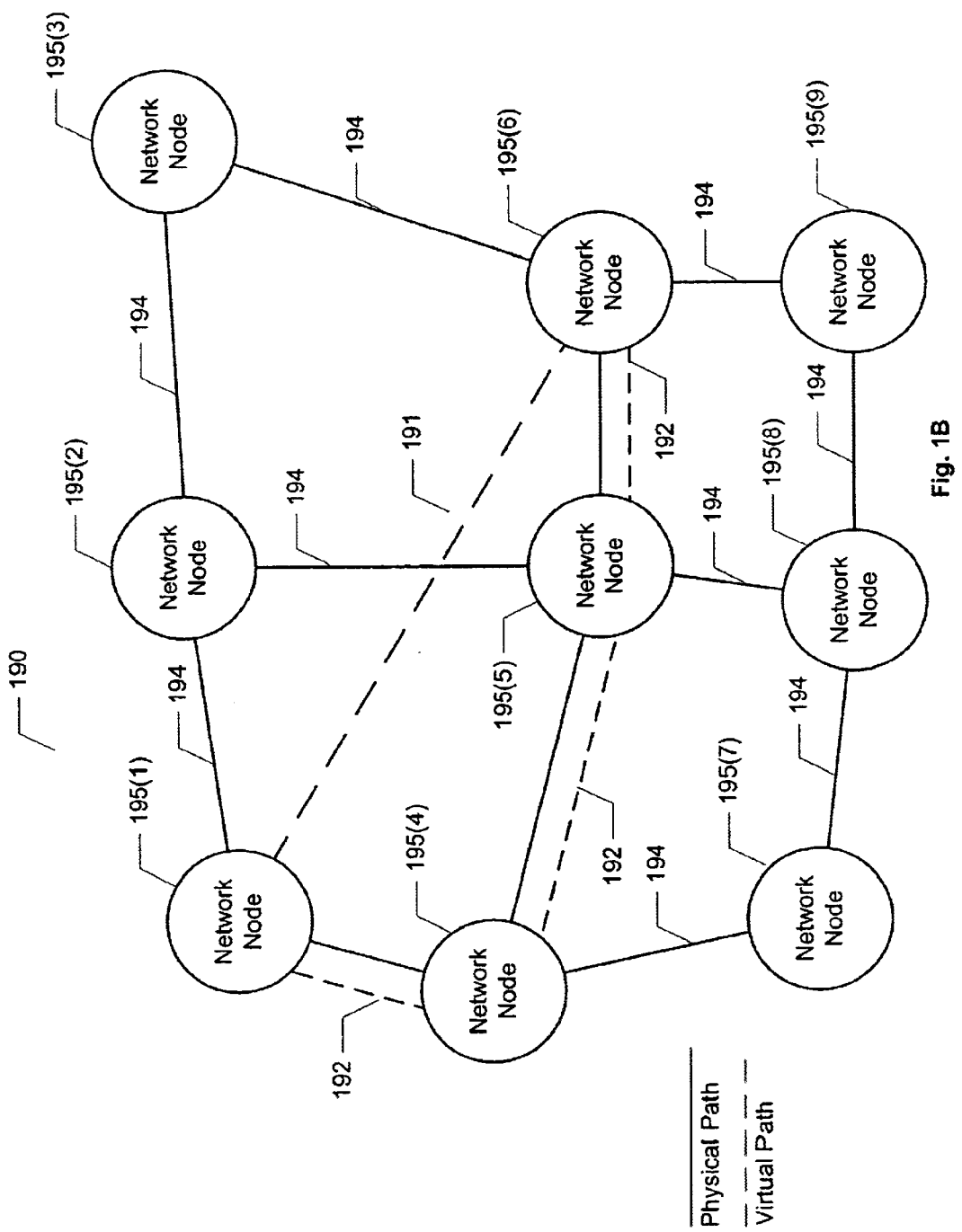
FIG. 1B is a block diagram of a network including a number of the routers of FIG. 1A.

FIG. 1A illustrates a router 100. Router 100 includes an input/output section 110, a node controller 120, and a switching matrix 130. Node controller 120 contains, for example, real time software and intelligent routing protocols (not shown). Router wavelength 100 supports interfaces including, but not limited to, optical signal interfaces (e.g., SONET), a user interface module 150, and a management system 160. Internal input signals 170 and internal output signals 180 may be electrical or optical in nature. FIG. 1B illustrates a network 190 that includes a number of nodes, network nodes 195(1)-(N). One or more of network nodes 195(1)-(N) can be a router such as router 100. Network 190 can thus support the automatic provisioning, testing, restoration, and termination of virtual paths (exemplified by a virtual path 191) over a physical path (exemplified by a physical path 192) from one of network nodes 195(1)-(N) to another of network nodes 195(1)-(N). Additional physical paths 194 couple the remaining network nodes in FIG. 1B.

Among other benefits, router 100 solves three growth-related problems often encountered in today's information networks, and particularly in SONET networks:

1. Port Capacity growth: Router 100 includes, for example, a scaleable architecture which can provide a large number of ports at a relatively low cost and high density.
2. Bandwidth management: The distributed management architecture of one embodiment of exemplary router 100 allows some or all nodes in the network to be managed from a single workstation. Provisioning a new connection is easily accomplished by selecting the source and destination nodes and specifying the required bandwidth and desired quality of service (QoS).
3. Efficient and fast restoration: Exemplary network 190 preferably uses a mesh topology. Through the use of routers such as router 100, the network can be more efficient than existing ring topologies, especially when connections span multiple rings. This is possible because a single spare connection in a mesh network can provide protection for several different possible span cusps. In a ring-based network, however, spares can typically only protect against failures on their own ring. Furthermore, when connections span multiple rings, "dedicated" spare bandwidth must typically be allocated on every ring along the path. No other connections can share this spare bandwidth. One embodiment of router 100 supports the restoration of a majority of network failures within less than 50 ms, thus eliminating an advantage that rings generally have over mesh topologies: fast restoration time. A protocol, such as that according to the application entitled "A METHOD FOR ROUTING INFORMATION OVER A NETWORK" (as previously referenced) can be run on such a router and encompasses all aspects of the restoration process: alarm gathering, path implementation (including alternate path discovery), and path assurance. In cases where there is insufficient bandwidth to satisfy all failed connections, the protocol, in one embodiment, can use a quality of service (QoS) metric to prioritize the restoration sequence. In such embodiment, connections with the highest QoS are restored first, followed, in a descending order, by those with a lower QoS, until either all connections have been restored or all available bandwidth has been used.

Router 100 is a multi-rack, fully redundant router that, in one embodiment, supports at least 256, 1+1 I/O ports, and provides 1-plus-1 protection by using multiple copies (e.g., two or more) of group and main matrices operating in 1+1 mode. Failures within one copy of a given matrix do not require a complete switchover to the backup copy. Only the affected paths through the matrix are switched to the backup copy. This greatly improves switching speed and minimizes the impact of such redundancy on other connections. Preferably, the group matrix is a 2:1 reduction stage that selects output signals from one of two line cards (also referred to herein as I/O modules, due to their functionality) and connects the selected output signals to the main matrix, thus preventing non-working channels from consuming ports on the main matrix.

In one embodiment, there are at least three types of processors in a router 100. The lowest level, level-3, resides on the line card and is responsible for all real time aspects of the processing of the physical protocol (e.g., SONET). In a SONET implementation, every level-3 processor is responsible for a single optical signal (e.g., an OC-48 signal) and, via a protocol processor, performs all required SONET/SDH section and line termination functions. The fast response time required from the level-3 processor makes a firmware implementation preferable. The firmware, which may be written in the "C" or "C++" programming languages, assembler, or other programming language, is preferably optimized for low latency and resource efficiency. Higher-level processing is implemented on a separate module, the shelf processor module, which is shared by several line cards.

The second level of processors, level-2, reside on a shelf and main matrix processor modules. The software on the shelf processor module is responsible for managing and controlling line cards. Only half the line cards supported are active at any one time in order to support 1+1 protection. A level-2 processor deals with tasks that require a reasonable response time (for example, on the order of milliseconds), but have no direct impact on the data path. In other words, missed events, such as hardware interrupts, do not result in bit errors. Some of the functions handled by the shelf processor include the periodic collection of maintenance data from the line cards, receiving and processing periodic keep-alive messages from those cards, shelf startup and configuration, proxy management, and other related functions.

The third processor level, level-1, resides on a system processor module and provides system-wide management and control services. In one embodiment, there are preferably two fully synchronous copies of the level-1 processor in the system, both of which are simultaneously active and, through a dedicated and redundant high-speed link, keep their run-time and stored databases fully synchronized. One of the two processors is designated the master and is responsible for all level-1 processing. An update message is sent to the second processor whenever a change is made to the database and before that change is effected. A periodic keep-alive mechanism allows either copy of the system controller to detect failures on the other copy.

Router 100 provides yet another type of processor, referred to herein as a route processor. Such a processor is dedicated to the path/route discovery and restoration functions. The route processor is responsible for receiving failure indications from the line cards, calculating a new route for failed connections, and sending reconfiguration requests to all affected nodes, including its own.

Hardware Architecture

In one embodiment, router 100 is a multi-rack communications system capable of terminating at least 8192 signals and cross-connecting at least 4096 OC-48 signals. Such a router can be used, for example, as SONET/SDH line terminating equipment (LTE) capable of terminating the Section and Line overheads of received OC-48 signals, and cross-connects those signals according to provisioned input-output mappings. Some of the terminated signals can optionally be protected using any of the common protection schemes (1+1, 1:1, and 1:N).

Overhead processing and generation is performed on the line card by a protocol processor. This protocol processor handles all aspects of the SONET protocol, including framing, insertion and extraction of embedded data channels, error checking, AIS detection, pointer processing, clock recovery, multiplexing/duplexing, and similar duties.

Signal Path

Figure 2:
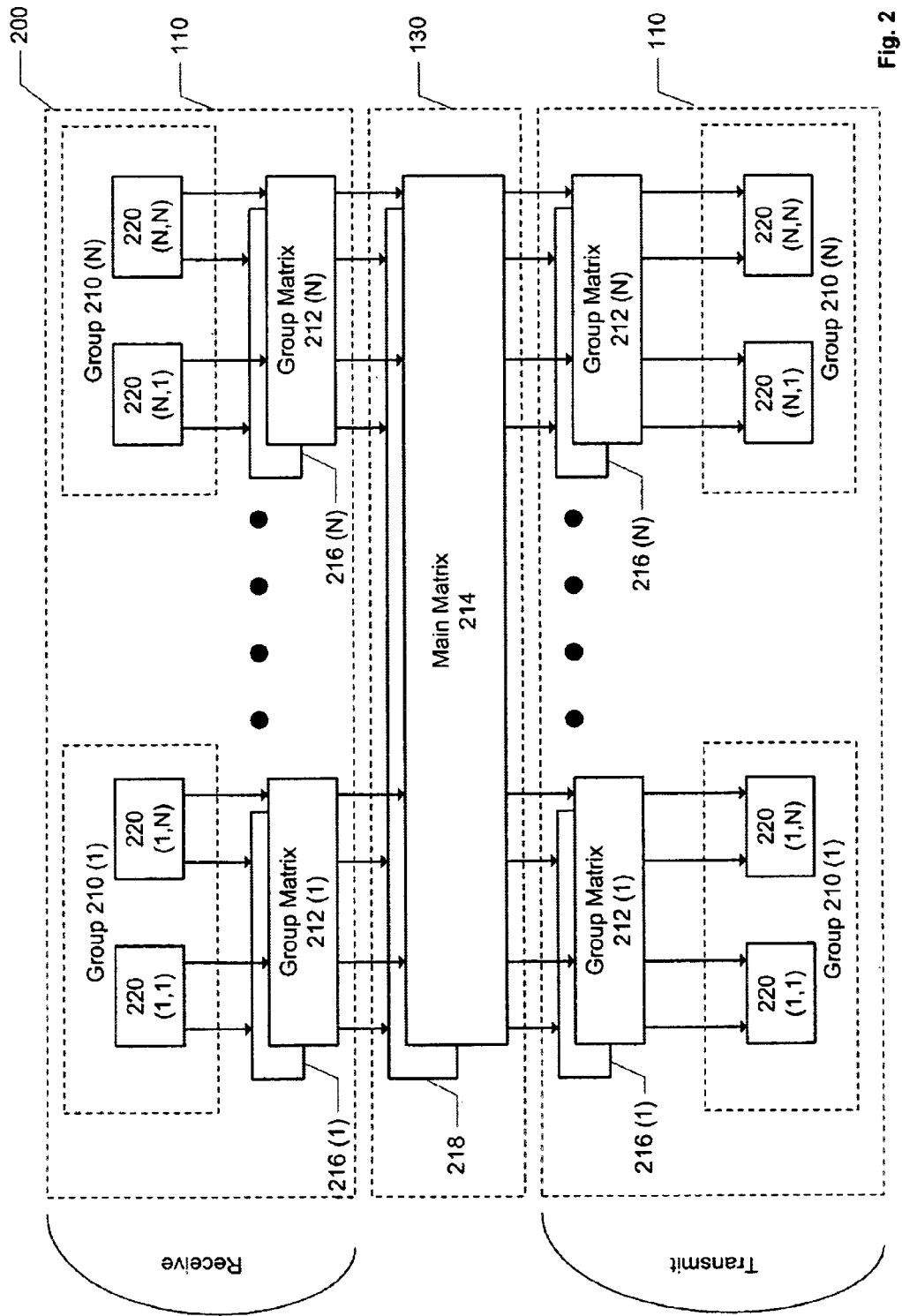
FIG. 2 is a block diagram of the signal paths and functional blocks of the router of FIG. 1A.

FIG. 2 is a block diagram of signal paths 200 within router 100. The primary signal paths in router 100 include one or more groups exemplified by groups 210(1)-(N), group matrices 212(1)-(N), and a main matrix 214. As depicted in FIG. 1A, groups 210(1)-(N), and group matrices 212(1)-(N) are shown as having receive and transmit sections. Groups 210(1)-(N) each include line cards 220(1,1)-(1,N), through line cards 220(N,1)-(N,N). Signals from line cards 220(1, 1)-(N,N) are sent to the corresponding group matrix. In one embodiment, two sets of the group matrix cards, group matrices 212(1)-(N) and 216(1)-(N) are employed. Main matrix 214 is also mirrored in one embodiment by a redundant copy, a backup main matrix 218, which together form switching matrix 130. As shown in FIG. 2, the redundancy for group matrices 212(1)-(N) (i.e. group matrices 216(1)-(N)), is also provided on the transmit side.

It will be noted that the variable identifier "N" is used in several instances in FIG. 2 (and subsequent use of other variables, such as "m", "x," "k," and others) to more simply designate the final element (e.g., group matrix 212(N), line card 220(N,N), and so on) of a series of related or similar elements (e.g., group matrices 212(1)-(N), line cards 220(1, 1)-(N,N), and so on). The repeated use of such variable identifiers is not meant to imply a correlation between the sizes of such series of elements. The use of such variable identifiers does not require that each series of elements has the same number of elements as another series delimited by the same variable identifier. Rather, in each instance of use, the variable identified by "N" (or "m," "x," "k," and others) may hold the same or a different value than other instances of the same variable identifier. For example, group matrix 212(N) may be the tenth group matrix in a series of group matrices, whereas line card 220(N,N) may be the forty-eighth line card in a series of line cards.

Using signal paths 200 as an example, data enters the system at one of line cards 220(1,1)-(N,N). It is at this point, in a SONET-based system, that the Section and Line overheads are processed and stripped off by a protocol processor (not shown). The extracted SONET/SDH payload envelope is then synchronized with the system clock and sent to two different copies of a local matrix, depicted as group matrices 212(1)-(N) and 216(1)-(N) in FIG. 1A. In one embodiment, group matrices 212(1)(N) and 216(1)-(N) are used mainly as 2:1 reduction stages that select one of two optical signals and pass the selected optical signal to switching matrix 130. This allows the implementation of a variety of protection schemes (including 1:N, or 0:1) without having to use any additional ports on main matrix 214. All protect signals are terminated at group matrices 212(1)-(N) and 216(1)-(N). In order to maximize bandwidth, it is preferable that only active signals be passed through to switching matrix 130.

In one embodiment, switching matrix 130 is an errorless, rearrangeably non-blocking switching network. In one embodiment, switching matrix 130 is a 256×256 switching network that consists of three columns and 16 rows of 16×17 switching elements that allow any of their inputs to be connected to any of their outputs, with the 17th output provided to permit fault detection within switching matrix 130. A single copy of the matrix may be housed, for example, in a single rack that contains three shelves, one for each column (or stage) of the matrix. Each one of such shelves contains cards housing the 16 switching elements in each stage. The switching element itself includes, for example, a 16×17 crosspoint switch, with optical transceivers, and a microcontroller for controlling the crosspoint switch and providing operational feedback to the level-2 processor. Communications between the two processors may be carried, for example, over an Ethernet connection. The level-2 processor in turn communicates with the level-1 and route processors.

The switching elements in each matrix copy of the exemplary embodiment may be connected using fiber-optic cables, for example. While copper cabling may also be employed, such an option may not offer the speed and number of connections provided by an optical arrangement. After passing through the stages of switching matrix 130, an optical signal may be routed to an I/O shelf that (optionally) splits the optical signal into two signals. One of the signals is sent to an active line card, while the other, when available, is sent to a backup card.

Line cards 220(1,1)-(N,N) receive optical signals from group matrices 212(1)-(N) and 216 (1)-(N) which are in turn connected to two separate copies of the main matrix. Line cards 220(1,1)-(N) monitor both signals for errors and, after a user-defined integration period, switch to the backup signal if that signal exhibits better bit error rate (BER) performance than the prior active signal. This scheme, referred to herein as 1-plus-1, allows line cards 220(1,1)-(N,N) to select between the two copies of the group matrix without any level-1 or level-2 CPU intervention. This helps to ensure that such a switch can be made in 50 ms or less (per Belicore's recommendations in GR-253 (GR-253: *Synchronous Optical Network* (SONET) *Transport Systems*, Common Generic Criteria, Issue 2 [Bellcore, December 1995], included herein by reference, in its entirety and for all purposes)). The selected signal is then processed by the transmit section of the protocol processor, which inserts all required transport overhead bytes into the outgoing stream.

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Control Path

Figure 3:
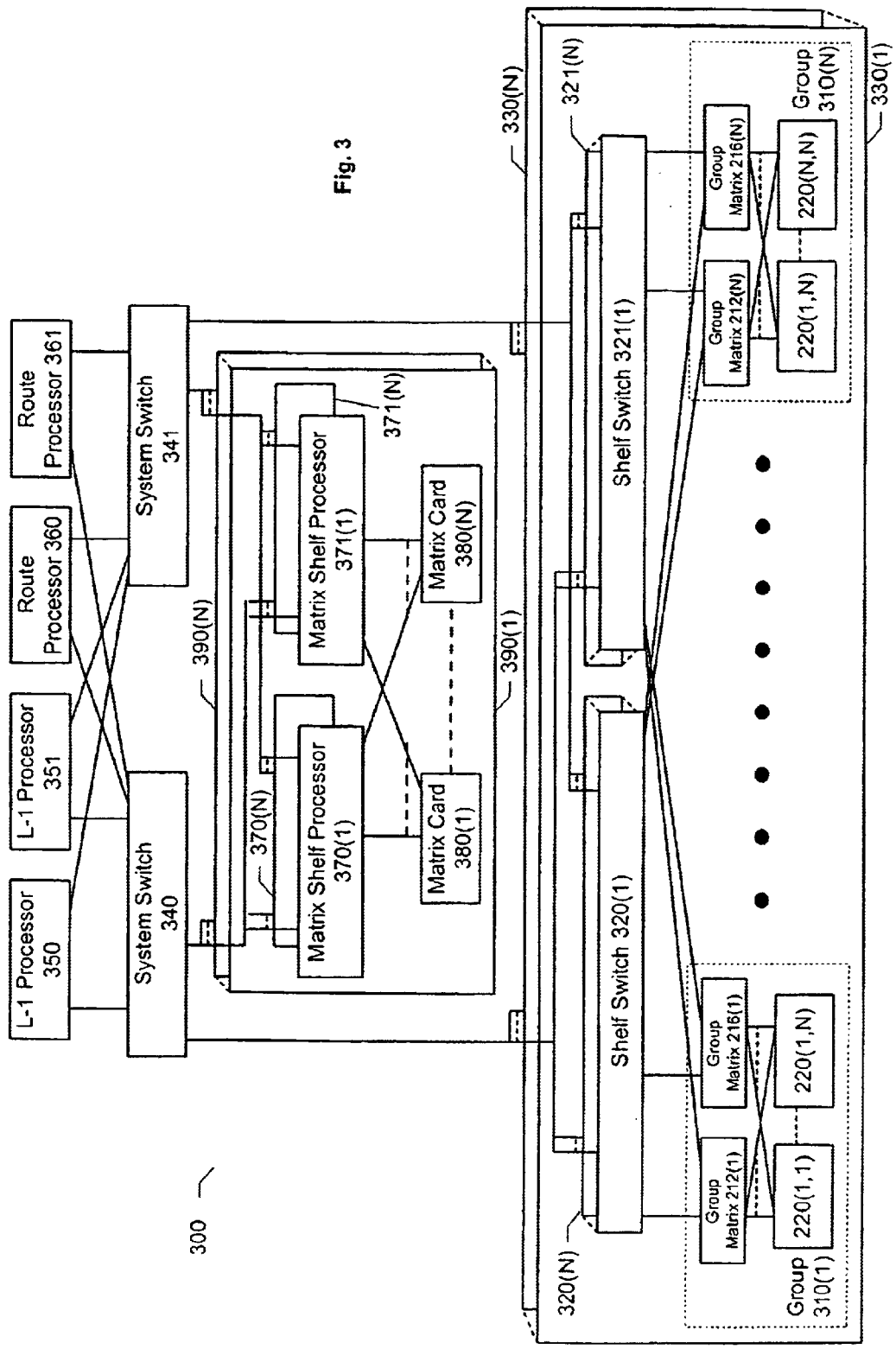
FIG. 3 is a block diagram of the control paths of the router of FIG. 1A.

FIG. 3 illustrates a control path 300 of a router, such as router 100. Control path 300 includes all non-payload-related flows within the system and the hardware and software necessary to the control of the signal paths illustrated in FIG. 2. All major control flows are carried over an internal local area network (LAN), which is, for example, a collection of switched Ethernet segments. The structure of the internal LAN is hierarchical and can be created using a mixture of 10 Mbps and 100 Mbps Ethernet segments, for example. Higher-speed segments (e.g., gigabit Ethernet) can be used as well.

Groups

At the bottom of the hierarchy is what is referred to herein as a group matrix, or a Group Ethernet Repeater in a system using Ethernet communications, and depicted in FIG. 3 as group matrices 212(1)-(N) and 216(1)-(N). Each one of group matrices 212(1)-(N) and 216(1)-(N), also referred to herein as a hub, a repeater, or concentrator, is a physical layer device and preferably supports a star network topology, such as the IEEE 802.3 10 BASE-T networking standard. The redundant connections from line cards 220(1,1)-(N,N) in each of groups 310(1)-(N) are connected to two repeaters that reside on two separate copies of the group matrix module. Preferably, each one of line cards 220(1,1)-(N,N) supports two network ports (e.g., 10 BASE-T Ethernet ports). The two sets of four signals from each port pass through a relay that selects one of them for connection to the LAN for purposes of redundancy. Groups 310(1)-(N) represent the first layer of the control bus hierarchy. Group matrices 212(1)-(N) and 216(1)-(N) are each controlled by a shelf processor (not shown, for the sake of clarity) and communicate with one of the shelf switches described below via LAN connections.

Shelf Ethernet Switch

FIG. 3 also illustrates certain features of router 100 pertaining to the relationship between shelf switches 320(1)-(N) and 321(1)-(N), and groups 310(1)(N). Groups 310(1)-(N) are again shown, with regard to the control functions thereof. In this depiction of groups 310(1)-(N), line cards 220(1,1)-(N,N) are shown as being attached to networking devices, indicated here as group matrices. Group matrices 212(1)-(N) and 216(1)-(N) may be, for example, multi-port Ethernet hubs running at 10 Mbps. Each of line cards 220(1,1)-(N,N) feed signals into two of group matrices 212(1)-(N) and 216(1)-(N). For example, line card 220(1,1) feeds received information to group matrix 212(1) and group matrix 216(1). Group matrices 212(1)-(N) and 216(1)-(N) each feed a signal into shelf switches 320(1)-(N) and 321 (1)-(N) of FIG. 2. Shelf switches 320(1)-(N) and 321(1)-(N) are each controlled by a shelf processor (not shown for the sake of clarity) and communicate with one of the system switches (not shown, for the sake of clarity).

Shelf switches 320(1)-(N) and 321(1)-(N) are the next higher level of the control hierarchy in router 100, and are located on the shelf processor module (exemplified by line racks (330(1)-N)). Each copy of shelf switches 320(1)-(N) and 321(1)-(N) interconnects six connections from the three groups in each shelf, another connection from the shelf processor, and one connection from system switch 340 (and 341). Shelf switches 320(1)-(N) and 321(1)-(N) can be implemented, for example, using an 8-port Ethernet configured to handle 10 Mbps Ethernet traffic and a single port, dual-rate switch (e.g., 10 Mbps/100 Mbps Ethernet).

System Switch

The next level of the hierarchy is the system switch, of which there are two copies in each router. These are shown as system switches 340 and 341 in FIG. 3. This fully redundant scheme prevents failures on one switch from taking down the entire control bus. In one embodiment, a system switch manages connections from the following sources:

1. High-speed connection(s) from shelf switches 320(1)-(N) and 321(1)-(N);
2. High-speed connection(s) to higher-level processors (e.g., redundant level-1 processors 350 and 351, and redundant route processors 360 and 361); and
3. High-speed connection(s) to matrix shelf processors 370(1)-(N) and 371(1)-(N) which, in turn, control matrix cards 380(1,1)-(1,N)), located in main matrix racks 390(1)-(N).

It will be noted that main matrix 214 includes matrix cards 380(1,1)-(1,N), and that, more generally, main matrices 214 and 218 are included matrix racks 390(1)-(N)

System switches 340 and 341 are located in a management bay. As noted, the fully redundant switches manage connections from various router elements, such as I/O and matrix bays, level-1 processors, and route processors. Each of level-1 processors 350 and 351 and route processors 360 and 361 is preferably connected to system switches 340 and 341 using 100 Mbps Ethernet connections in a configuration that creates an expandable, efficient, and fully redundant control bus.

Physical Configurations and Modules

I/O Bay

An I/O bay can support, for example, a total of 16 slots. Slots may be logically divided into functional groups. In such an embodiment, four such functional groups are defined with three of the groups occupying five slots each. In that embodiment, the other group, which occupies a single slot can be configured to house the shelf processor. Thus, the I/O bay can contain line cards and group matrices which are controlled by shelf processors. These elements are exemplary of line cards 220(1,1)-(N-N), group matrices 212(1)-(N) and 216 (1)(N), shelf processors 320 (1)-(N) and 321 (1)-(N), and shelf switches 440(1)-(N). It will be noted that the various line cards, group matrices, and shelf processors correspond to similar elements from previous figures.

Groups

A group is made up of line cards occupying a number of slots on a shelf. In one implementation, the group is 20 line cards that occupy five slots. Four of the slots hold, for example, 16 line cards at 4 per slot, with the last slot holding the group matrix. The same slot can be used with a wide variety of line cards and in various configurations. This architecture provides flexibility to allow any combination of line cards to be installed in each slot.

The fifth slot in the aforementioned embodiment can be configured to accept a group matrix. Preferably, two group matrix cards are employed, each containing a 2:1 optical reduction stage that "selects" working channels before the signals leave the shelf. In a 1+1 protection scheme, the two inputs to the line cards are classified as active and protect channels. The working channel is one of the active and protect channels that is selected based on bit error rate or other criteria, and so implements a redundancy scheme. This prevents the standby line cards from using any bandwidth on switching matrix 130.

Backplane

The following describes one embodiment of a backplane and some of the interface signals on that backplane. The backplane in the I/O bay shelf carries a variety of signals between line cards and other modules in the shelf. Each I/O shelf module is configured to allow an automatic, errorless switch from one power bus to the other.

Shelf processor module backplane signals include reset signals, clock signals, hardware detect signals (e.g., card detect, copy present, and the like), slot ID signals, and slot communication signals (both low and high speed). Line card backplane signals include reset signals, clock signals, communication signals, hardware detect signals, and slot ID signals. Group matrix module backplane signals include reset, clock signals, communication signals (both low and high speed), detection and hardware detect signals, and slot ID signals.

System Modules

Line Card

Figure 4:
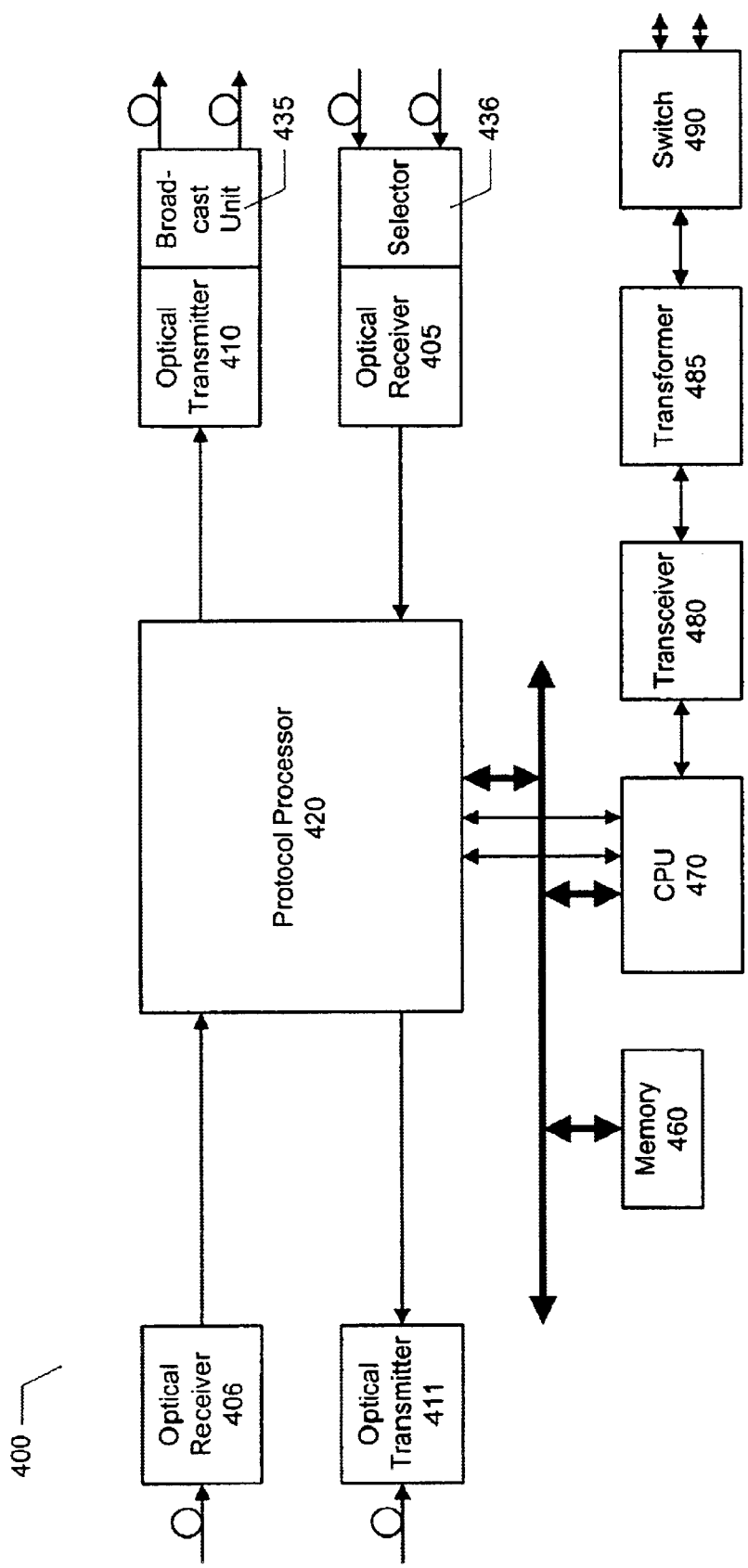
FIG. 4 illustrates the major components of one of the line cards.

FIG. 4 illustrates the major components of one of line cards 220(1,1)-(N,N), exemplified in FIG. 4 by a line card 400. A line card integrates all the necessary hardware and software functions to properly terminate the physical layer. In a SONET implementation, a line card terminates the transport overhead (Section+Line) of a full duplex OC-48 signal. Other components on this card provide a redundant optical connection to the switch matrix, and a communication channel to other modules in the system.

Line card 400 receives optical signals from other network elements via a line-side optical receiver 405 and from the local router's system via a system-side optical receiver 406. Each of these receivers implements an optical-to-electrical (O/E) conversion function. Line card 400 transmits optical signals to other network elements using a line-side optical transmitter 410 and to the group matrices using a system-side optical transmitter 411. Each of these transmitters implements an electrical-to-optical (E/O) conversion function. It will be noted that line-side refers to the side of the line card coupled to other network elements and system-side refers to the side of the line card coupled to the group matrices.

Line-side optical receiver 405 is coupled to a protocol processor 420 which performs clock recovery multiplexing, demultiplexing, and SONET STEILTE processing in both directions. Similarly, system-side optical receiver 406 is also coupled to protocol processor 420 to allow protocol processor 420 to receive optical signals. The processed electrical signals from protocol processor 420 are coupled to the transmitters 410 and 411. The clock recovery functions are combined with demultiplexers and multiplexers to support reception and transmission of the optical data, respectively. The multiplexers serialize output data generated in protocol processor 420 by performing parallel-to-serial conversion on the parallel data. In contrast, de-multiplexers are used in protocol processor 420 to perform serial-to-parallel conversion on received data.

In order to add protection channels, line-side optical transmitter 410 is also coupled to a 1:2 broadcast unit 435. To receive such optical signals, optical receiver 406 is also coupled to a 2:1 selector 436 in order to select the working channel before the optical signals leave the shelf and thus prevent the standby channel (also referred to herein as the protect channel) from using any bandwidth on switching matrix 130.

Protocol processor 420 is coupled to a bus 445. Protocol processor 420 interfaces the line card to two copies of the matrix in a 1+1 physical protocol. In a SONET implementation, protocol processor 420 provides both STE/LTE processing according to published industry standards. Also coupled to bus 445 are a memory 460 and a CPU 470. Memory 460 should be fast enough for efficient operation of CPU 470.

CPU 470 communicates with other of line cards 220(1, 1)-(N,N) over a control bus (not shown) using a transceiver 480 that is coupled to CPU 470. Transceiver 480, is coupled to a transformer 485 which is coupled to a switch 490. Switch 490 is coupled to the control bus. Switch 490 implements a 1:1 protection scheme for transceiver 480 and couples CPU 470 to two independent ports on the backplane (not shown). Each of the two ports connects to one copy of the hub of the group matrix. This allows the software on the line card to switch to the backup link when the software detects failures on the active link.

Preferably, CPU 470 includes numerous integrated peripherals including embedded SCC channels (e.g. in-band communications) and an Ethernet controller (for example, to support communications with other system modules). In one embodiment, CPU 470 provides an onboard communications processor module (not shown) that handles time-critical aspects of the protocols supported.

Group Matrix Module

The group matrix module includes two independent blocks: a group matrix and a hub (also referred to herein as a repeater).

Group matrix

Figure 5:
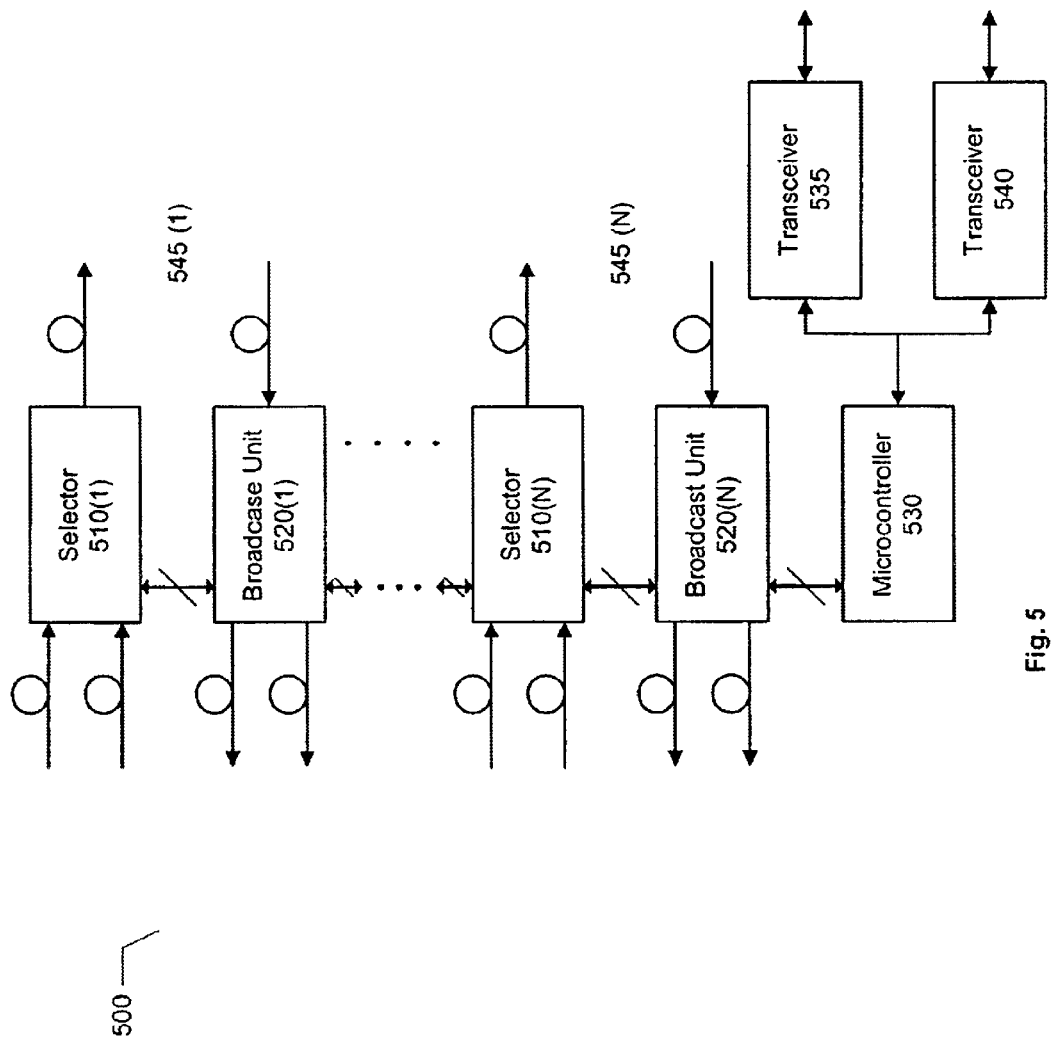
FIG. 5 illustrates an exemplary group matrix.

FIG. 5. illustrates an exemplary group matrix 500, which is exemplary of group matrices 212(1)-(N) and group matrices 216(1)-(N). In the embodiment shown in FIG. 5, group matrix 500 includes a series of 2:1 path selectors (exemplified by selectors 510(1)-(N)), broadcast units 520(1)-(N), and a microcontroller 530 controlling these. Selectors 510(1)-(N) select one of two full-duplex optical signals and couple the selected signal to switching matrix 130. Selectors 510(1)-(N) and broadcast units 520(1)-(N) are grouped into pairs to form I/O channels 545(1)-(N). Microcontroller 530 communicates with other elements of router 100 via redundant transceivers (exemplified by transceivers 535 and 540). For example, microcontroller 530 can control selectors 510(1)-(N) and broadcast units 520(1)(N) through commands received from the group processor.

Hub

One or more hubs are also provided to support communication between the group matrices and system switches in router 100. In an Ethernet communications environment, the hub's functions are carried out primarily by repeater interface controllers (RICs). Each RIC integrates the functions of a repeater, clock and data recovery unit (CDR), Manchester encoder/decoder, and transceiver. Each RIC has a set of registers that convey status information and allow a number of configuration options to be specified by the user using, for example, a microcontroller.

Shelf Processor Module

The shelf processor module provides, among other elements, a shelf processor and switch that interconnect the LAN segments from the groups and the shelf processor to a port on the shelf switch (Ethernet switch 630).

Shelf Processor

Figure 6:
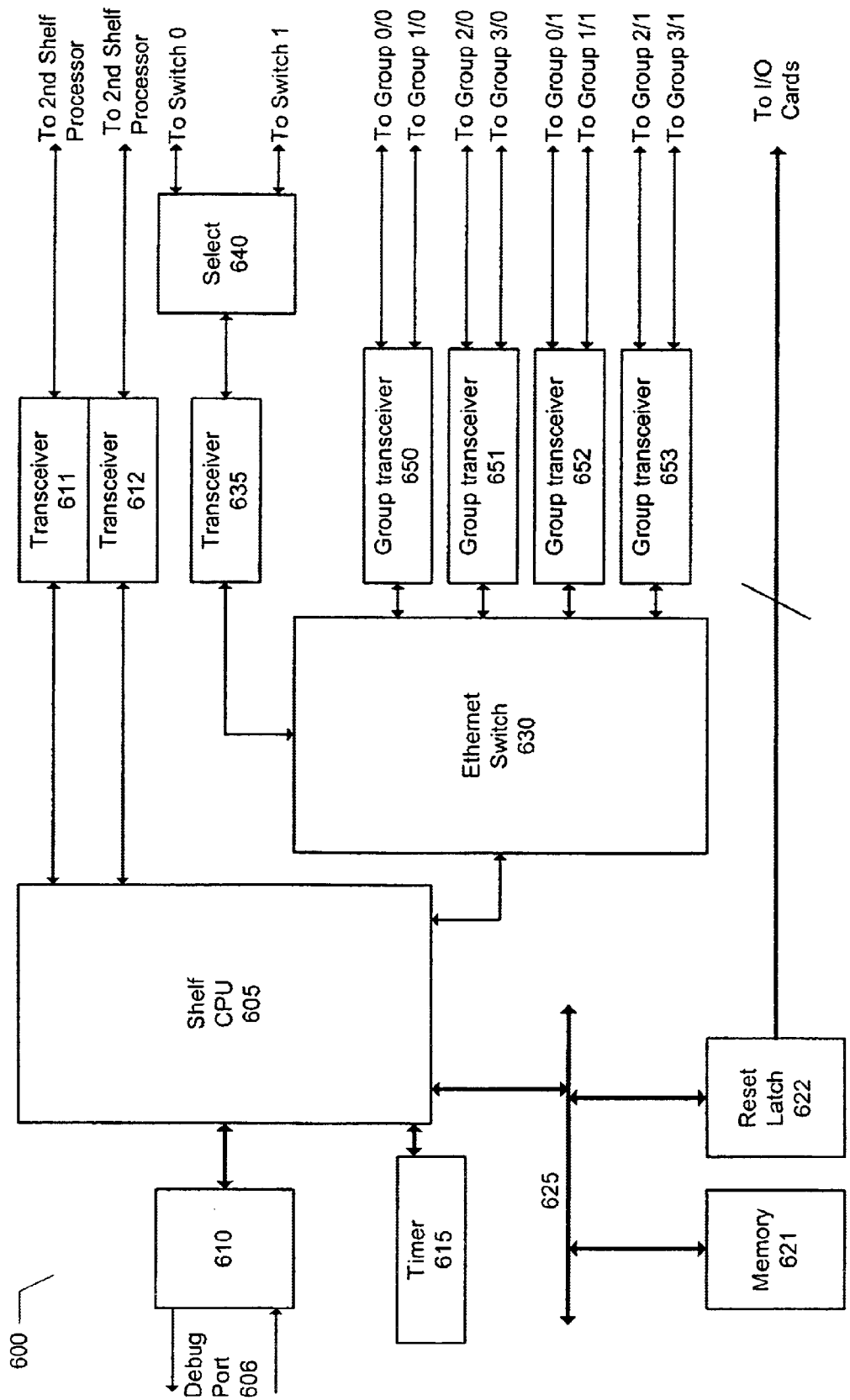
FIG. 6 illustrates a shelf processor which is responsible for the overall operation, management and control of a shelf.

FIG. 6 illustrates a shelf processor 600 which is responsible for the overall operation, management, and control of the shelf. A shelf CPU 605 controls the functions of shelf processor 600. Shelf CPU 605 is connected to a debug port 607 via a debug port transceiver 610. Debug port 607 may be a device capable of coupling shelf CPU 605 to a personal computer or dumb terminal. Debug port 607 allows a user to access shelf processor module 600 to determine the cause of any errors therein. Transceivers 611 and 612 each connect an SCC channel of shelf CPU 605 to the other shelf processor. The resulting link, which can use high-speed asynchronous framing, serves as an inter-processor communications interface.

Shelf CPU 605 is also connected to a timer 615, which preferably contains the following three functional blocks:

1. Power-fail-reset
2. External reset
3. Timer

Shelf CPU 605 also accesses a memory 621 and a reset latch 622 over a CPU bus 625. Reset latch 622 supports reset of one or more cards (not shown). Shelf CPU 605 is also coupled to an Ethernet switch 630. The network switch interconnects the lower speed inter-processor communication network segments in each shelf. In one embodiment, the network switch provides support for 10 Mbps and 100 Mbps segments. In one embodiment, an integrated bus master and slave interface allow multiple devices to be interconnected.

Ethernet switch 630 is coupled to a transceiver 635 which, via a select 640, allows Ethernet switch 630 to connect to two separate Ethernet segments. Select 640 implements a 1:1 protection scheme that allows shelf processor 600 to recover from failures on the active segment by simply switching to the other segment. Ethernet switch 630 is also coupled to one or more group transceivers (exemplified by group transceivers 650, 651, 652, and 653). Group transceivers 650, 651, 652, and 653 connect ports on Ethernet switch 630 to the groups.

System Switch

One embodiment of a system capable of interconnecting network segments in a switched configuration allows communications between shelf switches, higher-level (e.g., level-1) processors, and shelf-processors. In an Ethernet-based system, the system switch supports both 10 Mbps and 100 Mbps connections. The segments come from the shelf switching in the I/O shelf and the matrix switches, among others, and allow these elements to communicate.

Main Matrix Bay

Switching in router 100 is based on a rearrangeably non-blocking network. A switching matrix, as described herein consists of switch nodes arranged in a staged array. For a 256×256 switching matrix, for example, switching matrix 130 consists of 48 nodes arranged in an array of 16 rows by 3 columns, with each column containing one stage of the switch matrix. All 48 nodes in the switch matrix are substantially similar and consist of a crossbar device that allows any of its inputs to be connected to any of its outputs, regardless of the current state of the crossbar.

Main Matrix

Figure 7:
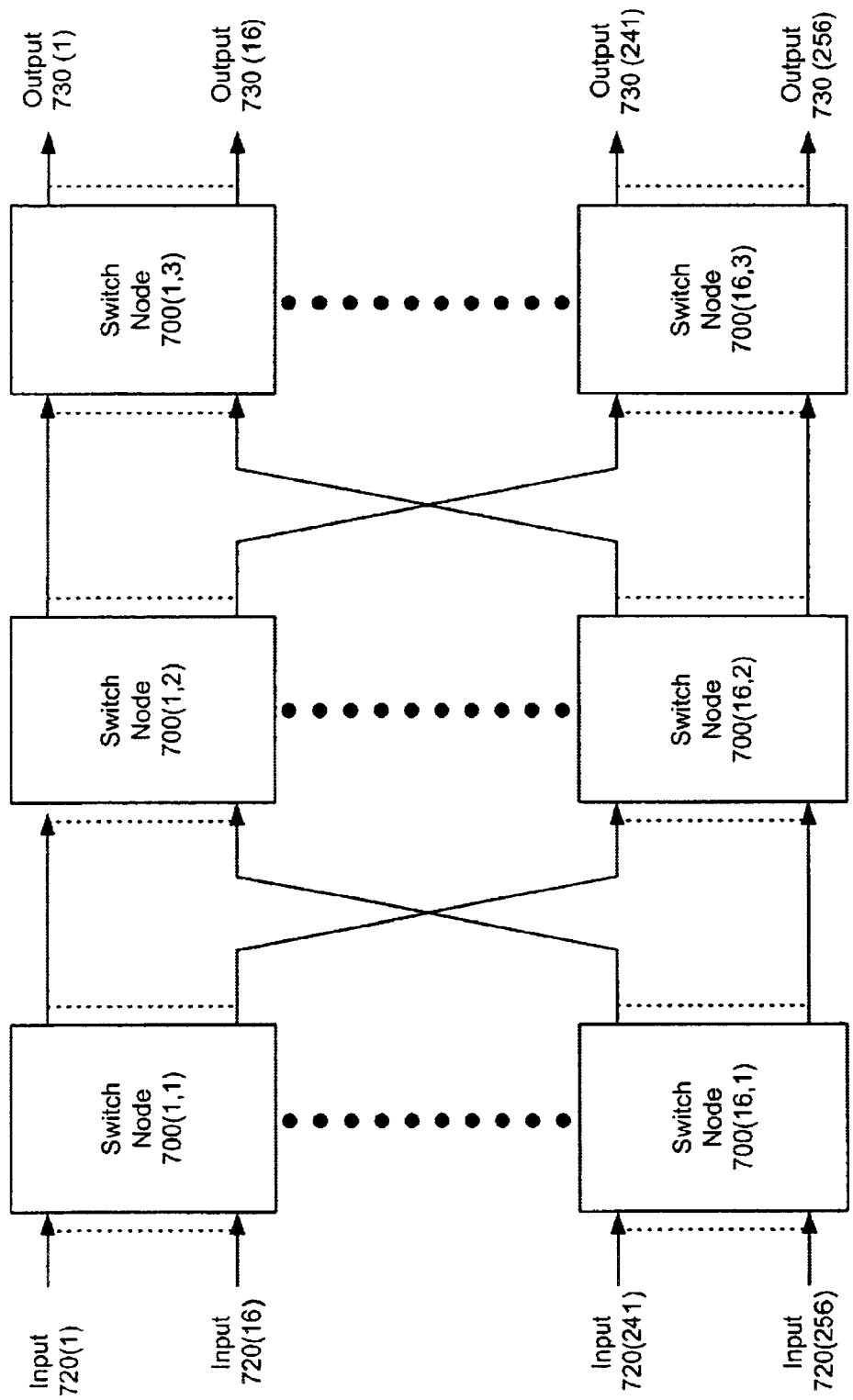
FIG. 7 illustrates the structure of a multistage matrix.

FIG. 7 illustrates switching matrix 130 configured in the manner of the switch matrix just described. In one embodiment, switching matrix 130 employs a 256×256 matrix, an array of switching nodes 700(1,1)-(16,3), each of which is a 16×17 crossbar switch that allows any input signal to be connected to any of its outputs, regardless of the current state of the crossbar. The last (i.e., 17th) output from each of the switch nodes is connected to an error monitor (e.g., in a SONET-based system) that performs error detection and allows any of the input signals to be tested. In one environment, each of the interconnections between switching nodes 700(1,1)-(16,3) represent dual gigabit interconnections. As noted, the embodiment illustrated in FIG. 7 supports the switching of up to 256 inputs, shown as inputs 720(1)-(256). Inputs 720(1)-(256) are switched to one of outputs 730(1)-(256). It should be noted that FIG. 7 does not illustrate the fault isolation output of any of switching nodes 700(1,1)(16,3) for reasons of clarity.

Physically, each of the 48 switching nodes of this embodiment occupies a single slot in a matrix rack, such as that described below. The rack described below is arranged with three shelves (one per matrix column) that house the switch node cards (there are 16 such cards in every shelf) and six-shelf-processor cards (two per shelf).

Matrix Rack

A rack is used to hold one or more matrices, and is referred to herein as a matrix rack. In one embodiment, a matrix rack is configured to hold 48 switching nodes (i.e., switching nodes 700(1,1)-(16,3)) in a compact physical configuration. The matrix rack thus can support, for example, switching nodes 700(1,1)-(16,3), which each provide 16 input signals and 17 output signals, and thus provides switching matrix 130 with 256 input signals and 256 output signals, along with a fault detection output for each node to allow the detection of faults within the respective node. Matrix shelf processors are configured in redundant pairs to provide fault-tolerant control of switch nodes 700(1,1)-(16,3).

The cross-connect information, i.e. input-to-output mapping, is written into the crosspoint switch by a local microcontroller which receives such information from the local shelf processor over a high-speed connection. The three shelf processors in each rack receive such information from the node controller, which resides in a different rack. This hierarchy can be extended indefinitely. The crosspoint switch receives a high speed serial data from the optical receivers that perform optical-to-electrical conversion on the received optical signals. Data from the crosspoint switch is retimed to synchronize the data with the system clock of router 100, using a clock and data recovery (CDR) unit, before being converted back into an optical signal that connects to the next stage of the matrix over fiber-optic cables.

Switch Node Module

Figure 8:
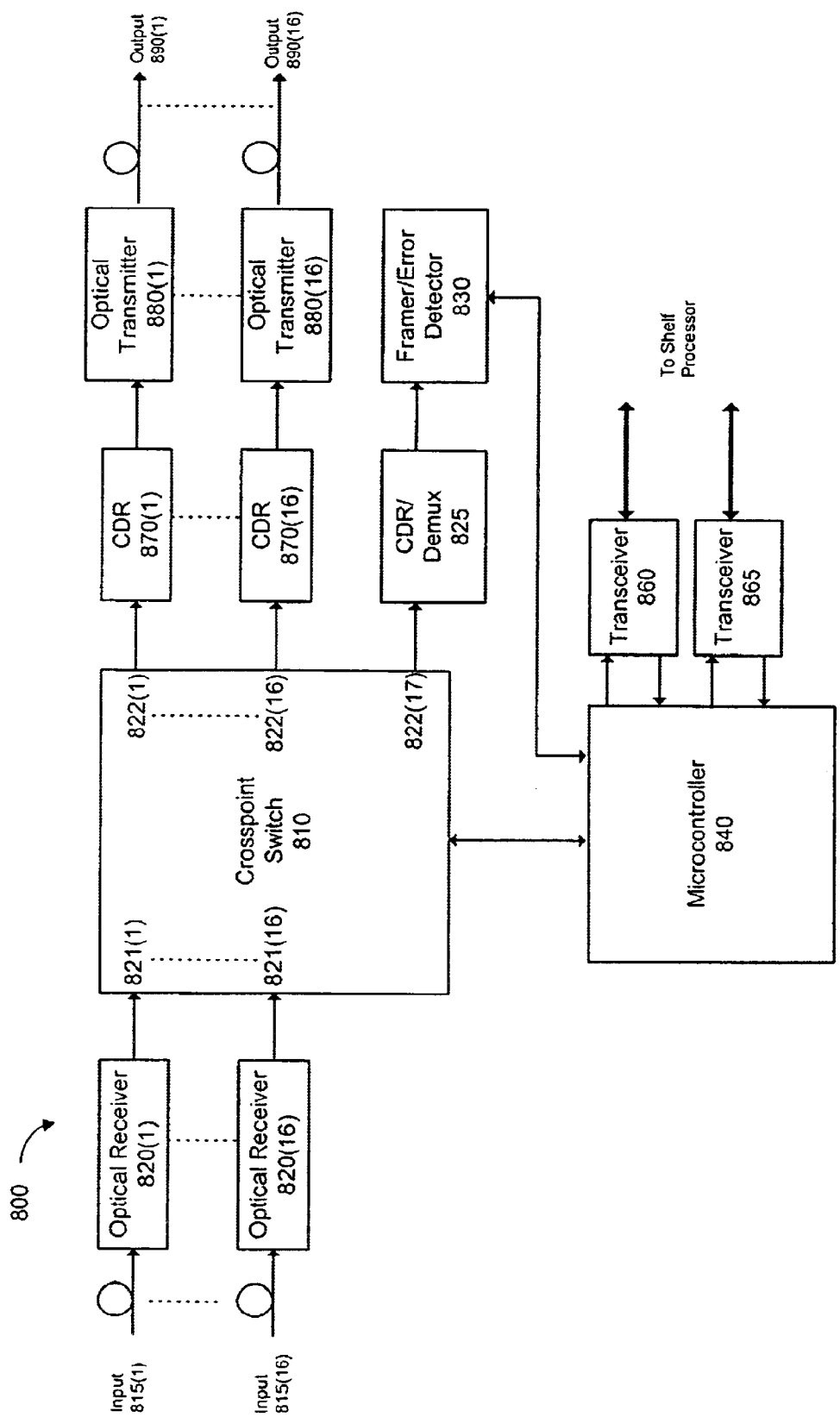
FIG. 8 illustrates one of the switching nodes.

FIG. 8 illustrates one of switching nodes 700(1,1)-(16,3) as a switching node 800. Switching node 800, in one embodiment, is a complete, strictly non-blocking, 16×17 OC-48 multi-stage crossbar matrix which allows any of its inputs to be connected to any of its outputs regardless of the current state of the matrix. A crosspoint switch 810 is controlled by a local microcontroller (a microcontroller 840) that also manages the optical transceivers, CDRs, and onboard SONET device. Configuration information is downloaded to switch node 800 from microcontroller 840 over a low-speed bus.

The block diagram of switch node 800 in FIG. 8 illustrates the main elements of a switch node using a SONET-based implementation. The core of switch node 800 is crosspoint switch 810. Crosspoint switch 810 is preferably a 2.5 Gbps 16×17 differential crosspoint switch with full broadcast capability, when implementing a 256×256 matrix that supports fault isolation according to an embodiment of the present invention. Any of its input signals can be connected to any, or all, of its output signals, including the node's fault isolation outputs. The device can be configured, for example, via a low-speed port through a two-step/two-stage process. This process allows changes to be made to switch configuration without disturbing its operation.

Assuming 16 input signals (indicated in FIG. 8 as inputs 815(1)-(16)), crosspoint switch 810 is configured to receive optical input signals from optical receivers 820(1)-(16) at switch input signals 821(1)-(16). Crosspoint switch 810 also provides switch outputs 822(1)-(17), of which switch outputs 822(1)-(16) serve as the source output signals for switch node 800, while switch output 822(17) is used in the detection of errors. Switch output 822(17) is fed into a CDR/DEMUX 825, in which the clock is recovered and the input signal demultiplexed from a serial stream into a parallel stream. The CDR is used to re-time the serial data after the data has passed through the crosspoint switch. This helps eliminate most of the accumulated noise and jitter, and ensure that the eye opening is wide enough to carry the signal from one stage of the matrix to the next. CDR/DEMUX 825 performs two functions: first, using a stable reference clock, CDR/DEMUX 825 recovers the clock signal from the incoming data stream, then CDR/DEMUX 825 uses the recovered clock to convert the serial stream into parallel data. CDR/DEMUX 825 can also supply a 155 MHz word clock that can be used by an external physical layer processor to sample data from the device. In some embodiments, the clock and data recovery unit may include a phase-locked loop.

The parallel data is fed into a framer/error detector 830. In one embodiment, framer/error detector 830 is a physical layer device that performs framing and parity computations on an STS-48 signal. Parity errors detected by framer/error detector 830 are counted and then in turn reported to the matrix shelf processor (not shown, but shown as shelf CPU 605 in FIG. 6). Framer/error detector 830 is controlled by microcontroller 840, which can also perform bit-error tests on incoming STS-48 signals when instructed to do so by the shelf processor. Parity errors detected by framer/error detector 830 are counted and in turn reported to the matrix shelf processor. Microcontroller 840 is also responsible for detecting and reporting loss-of-signal (LOS) and out-of-lock (OOL) conditions from the optical receivers, CDRs, and framer/error detector 830, respectively. Microcontroller 840 communicates with the shelf processor via transceivers 860 and 865 over a bus that carries asynchronous data over the backplane (not shown). Incoming signals (which may be simultaneously analyzed for errors by being routed to switch output 822(17)) are routed to one of switch outputs 822(1)-(16). Switch outputs 822(1)-(16) are coupled to CDRs 870(1)-(16), which in turn drive optical transmitters 880(1)-(1,16). The outputs from optical transmitters 880(1)(16) appear at outputs 890(1)-(16) as optical signals.

Figure 9:
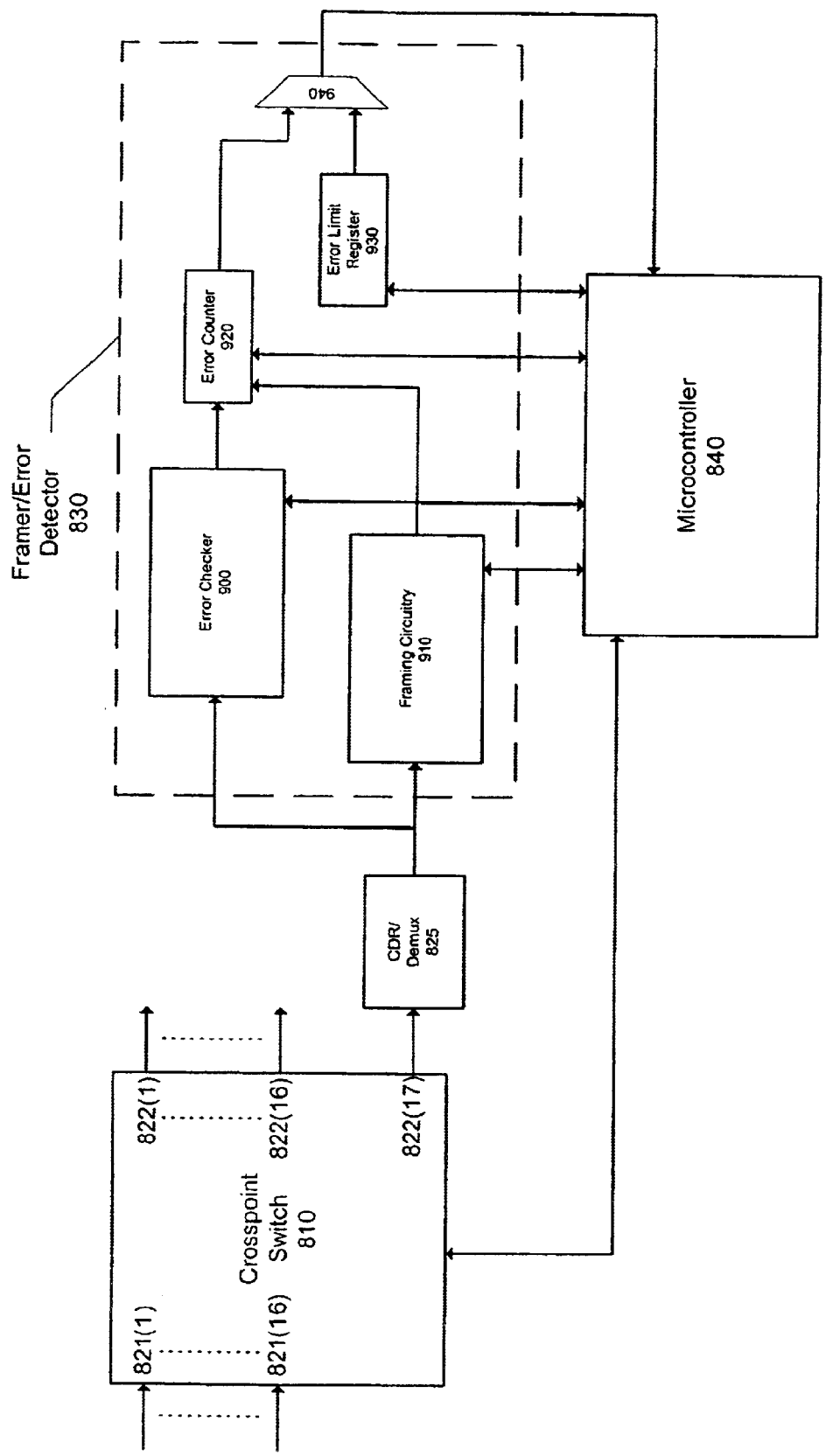
FIG. 9 illustrates, in detail, an error detection architecture according to one embodiment of the present invention.

FIG. 9 illustrates portions of switching node 800 of FIG. 8 in greater detail. More specifically. FIG. 9 illustrates certain of the components of one embodiment of framer/error detector 830. In this embodiment, framer/error detector 830 includes an error checker 900, framing circuitry 910, an error counter 920, an error limit register 930, and a comparator 940. Although error checker 900 and framing circuitry 910 are depicted in FIG. 9 as taking their input from CDR/demultiplexer 825, these elements could also take their input directly from crosspoint switch 810 (e.g., switch output 822(17)). Error checker 900 and framing circuitry 910 are both controlled by microcontroller 840, which downloads parameters to these elements and receives information such as error information there from. Error checker 900 and framing circuitry 910 provide error information to error counter 920, as depicted in FIG. 9. Alternatively, microcontroller 840 can interact directly with error checker 900 and framing circuitry 910 to gather and process error information directly. Error checker 900 can be one of a number of designs and perform one of several types of error analyses on the data stream being analyzed, as can framing circuitry 910. Error checker 900 can be, for example, one of a number of different types of bit parity generators. In some embodiments error checker 900 may be configured to receive several frames in a sequence, to generate parity information for a currently-processed frame of those frames, where the currently-processed frame occurs at a particular position in the sequence, and to compare the parity information to a parity entry in another one of the frames. In one embodiment, each of the frames is a SONET frame, the parity entry is a B1 byte of a SONET frame, and the other one of the frames is at another position in the sequence that is immediately subsequent to the position in said sequence.

Framing circuitry 910, in an environment in which the data stream being tested is divided into frames (e.g., SONET), provides error information that includes loss-of-frame error, out-of-frame error, and lost-of-signal error information. Additionally, framing circuitry 910 provides framing information to error checker 900, allowing error checker 900 to synchronize itself with the incoming data stream. Information provided to error checker 900 by framing circuitry 910 can included, for example, indication of a start-of-frame condition, an end-of-frame condition, and one or more of the previously-described framing errors. Indications of the occurrence of an error from error checker 900 and framing circuitry 910 are provided to error counter 920, which is accessible by microcontroller 840. Also shown in FIG. 9, error limit register 930 is coupled to comparator 940, as is error counter 920. With the addition of these elements, framer/error detector 830 is capable of generating a signal (e.g., an interrupt signal) to microcontroller 840. This might be used, for example, to allow microcontroller 840 to measure the amount of time required for a given number of errors to occur.

Figure 10:
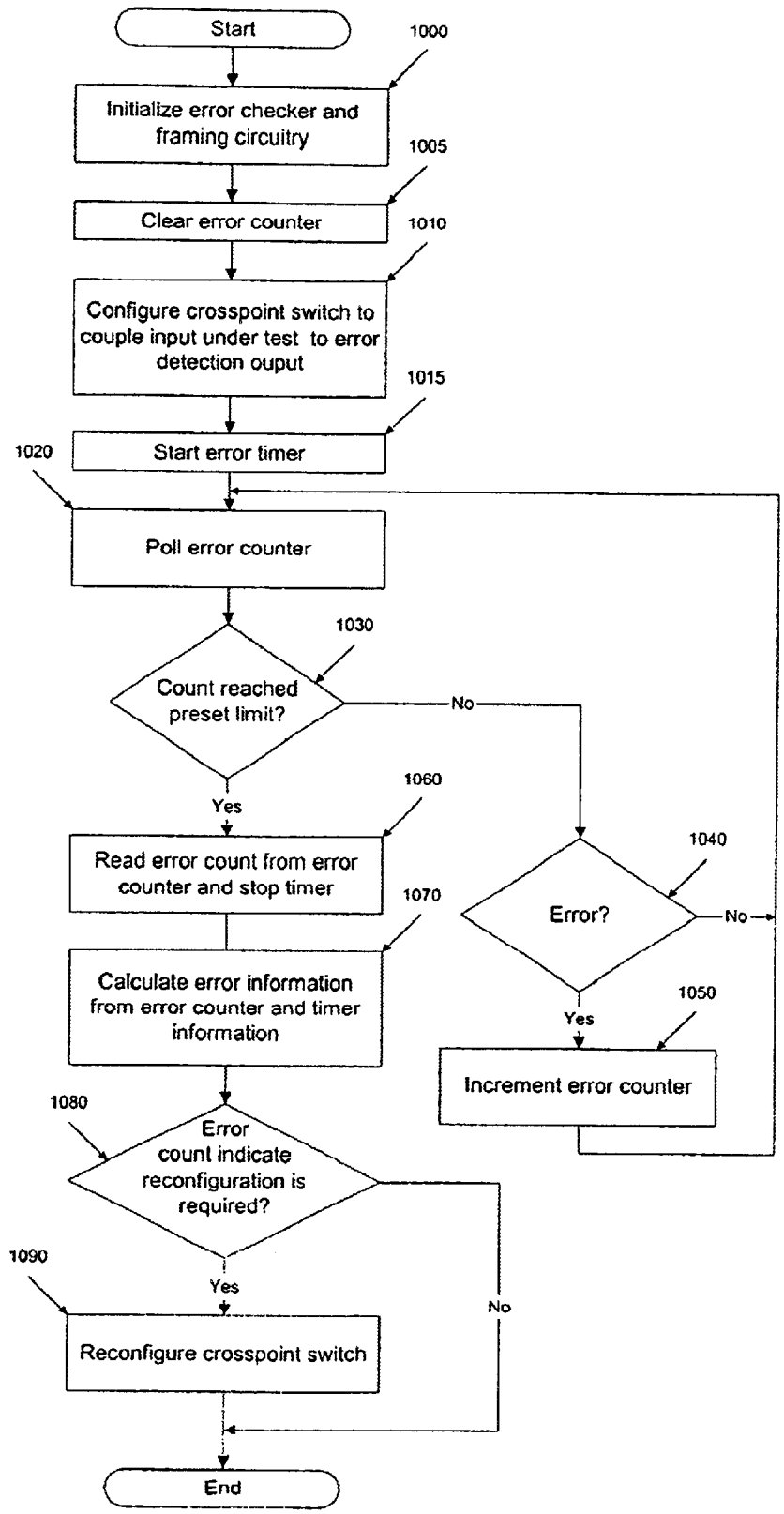
FIG. 10 illustrates a process capable of being performed by the error detection architecture of FIG. 8.
Figure 11:
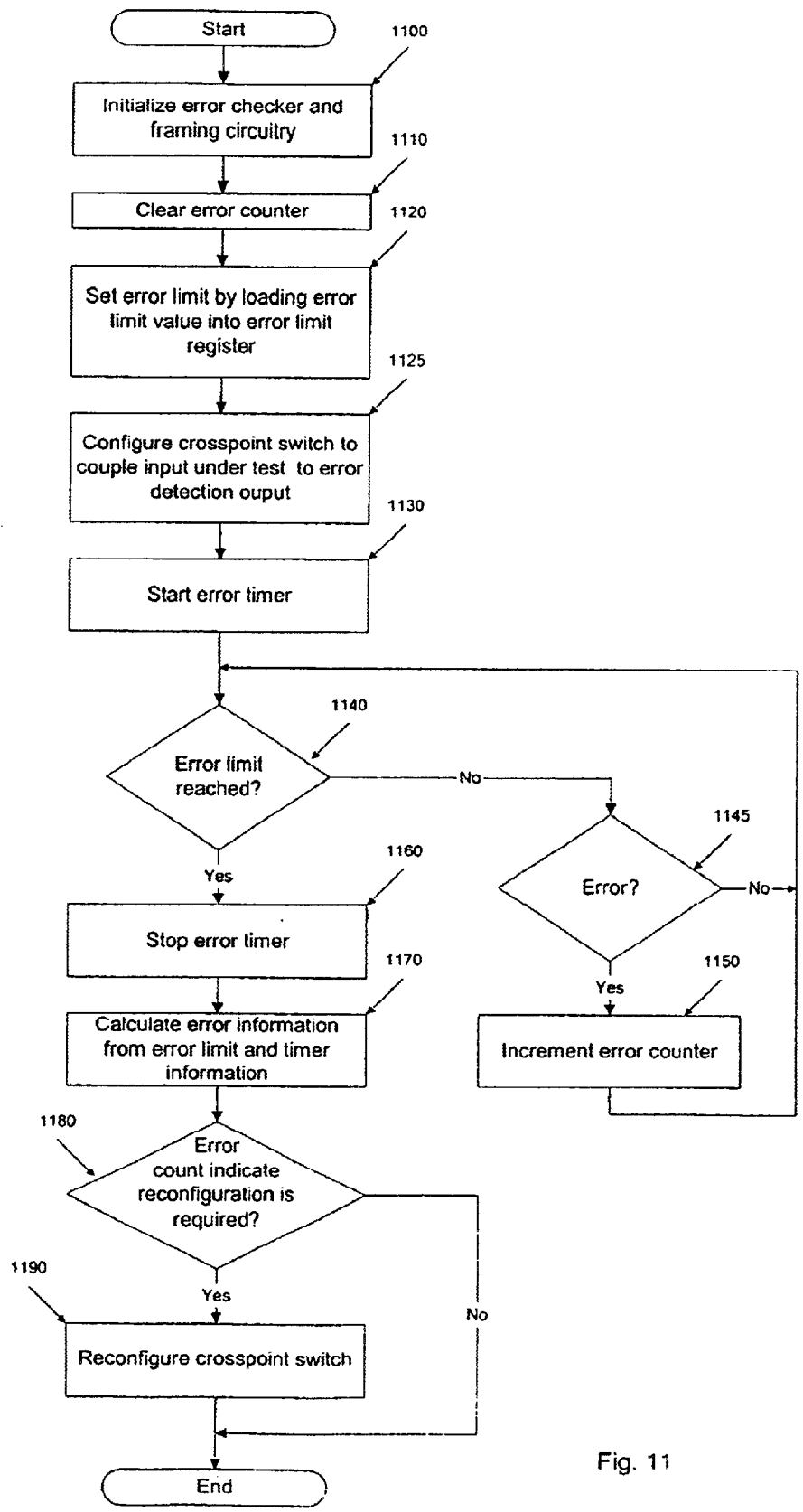
FIG. 11 illustrates another process capable of being performed by the error detection architecture of FIG. 8.

FIGS. 10 and 11 illustrate two of the several possible error detection techniques that may be practiced using the architecture depicted in FIG. 9. It will be apparent to one of skill in the art that several other techniques may be practiced using the architecture of FIG. 9. FIG. 10 illustrates one of the processes that may be carried out using the architecture of FIG. 9. The process begins with the initialization of error checker 900 and framing circuitry 910 (step 1000). Next, microcontroller 840 clears error counter 920 (step 1005). It will be noted that, in this embodiment, the contents of error counter 920 are zeroed and error counter 920 is incremented for each error that is detected. Alternatively, error counter 920 could be set to a desired value and decremented for each error detected. Crosspoint switch 810 is then configured to couple the data stream at the input under test to the error detection output (e.g., switch output 822(17)) (step 1010). Optionally, an error timer within microcontroller 840 is started (step 1015). Next, microcontroller 840 polls error counter 920 (step 1020) to determine if the number of errors detected so far has reached a limit preset within microcontroller 840 (step 1030). If the error count has not reached this preset limit, error counter 920 continues to count errors detected by error checker 900 and framing circuitry 910 (step 1040), incrementing the value held in error counter 920 for each error detected (step 1050). Microcontroller 840 continues to poll error counter 920 until the error count limit preset within microcontroller 840 has been reached (steps 1020 and 1030). Once the limit has been reached, the error count is read from error counter 920 and the error timer is stopped (step 1060). Using the error count and, optionally, the final value of the timer, microcontroller 840 calculates error information (step 1070). If the error information indicates that a failure has occurred in crosspoint switch 810 (step 1080), microcontroller 840 reconfigures crosspoint switch 810 in order to avoid errors in the data streams transiting crosspoint switch 810 (step 1090). Optionally, microcontroller 840 can indicate to the system's user that a failure has occurred and can also be programmed to request direction from the user in responding to the failure. In some cases, the failure may required human intervention in the form of repair and/or replacement of circuit elements or switching elements in the router. With respect to error counter 920, an alternative is to have error counter 920 clear itself when an error-free frame is received. Another alternative is to increment error counter 920 by a first programmable amount (e.g., "n"), in response to receiving a bad frame, and decrement the error count by a second programmable amount (e.g., "rn") when a good frame is received.

FIG. 11 illustrates another error detection process that may be carried out using the architecture of FIG. 9. The process again begins by initializing error checker 900 and framing circuitry 910 (step 1100). Error counter 920 is then cleared (1110) and the error limit is set by loading an error limit value into error limit register 930 (step 1120). Next, crosspoint switch 810 is configured by microcontroller 840 in order to couple the input under test to the error detection output of crosspoint switch 810 (step 1125). Optionally, an error timer is started (step 1130). Error counter 920 then counts errors detected by error checker 900 and framing circuitry 910 until the error limit is reached (step 1140). Having set the error limit in error limit register 930, the error limit determination is made by comparator 940, which compares the current value held in error counter 920 and that programmed into error limit register 930 by microcontroller 840. If the error count has not reached the error limit, error counter continues to tally errors detected by error checker 900 and framing circuitry 910 (steps 1145 and 1150). Once the value held in error counter 920 reaches that limit set in error limit register 930, comparator 940 generates a signal which is received by microcontroller 840 (step 1140). This signal may be, for example, an interrupt which causes microcontroller 840 to execute an interrupt handler routine that performs some or all of the following actions.

Once the error limit has been reached, the error timer is stopped, if one was started for this process (step 1160). Next, error information is calculated based on the error limit programmed into error limit register 930 and, optionally, on timer information (e.g., the initial time increment loaded into the timer for a countdown timer) (step 1170). If the error information so calculated indicates that reconfiguration of crosspoint switch 810 is required (step 1180), crosspoint switch 810 is reconfigured to address the failure indicated by the error information (step 1190). Alternatively, as noted, actions taken might also include alerting a system administrator, or requiring user intervention in the form of manual routing or replacement of circuit elements.

Figure 12:
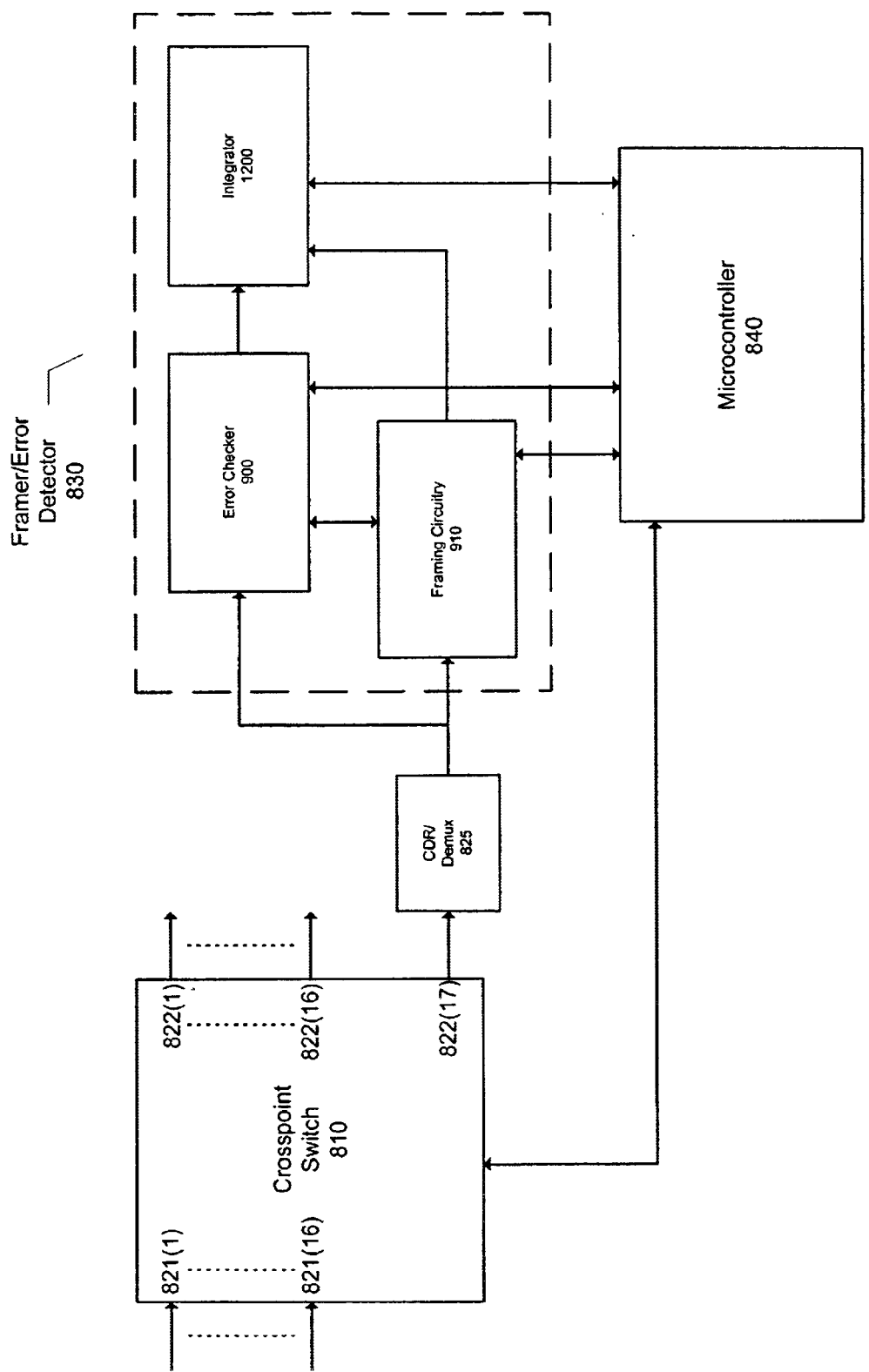
FIG. 12 illustrates, in detail, an error detection architecture according to another embodiment of the present invention.

FIG. 12 illustrates another embodiment of framer/error detector 830. In this embodiment, error checker 900 and framing circuitry 910 are coupled to an integrator 1200. Integration of errors over time can be used to produce a Bit Error Rate (BER) for the data stream under test. These calculations may be performed by microcontroller 840 or, to reduce the computational load on microcontroller 840, these operations may be off-loaded to integrator 1200. Depending on the architecture of error checker 900, error counter 920 of FIG. 9 can be eliminated by subsuming that function into error checker 900. As will be apparent to one skilled in the art, a counting function such as that provided by error counter 920 can be effected through the use of a counter, an accumulator, a ring-counter, or other such construct. As such, this functionality could also be included in error checker 900. Moreover, through the use of software and standard input/output (I/O) interfaces found on most microcontrollers and microprocessors, this function could actually be performed by microcontroller 840. These comments apply equally to framing circuitry 910 and the error counting functions provided thereby. With these permutations in mind, it will be apparent to one of skill in the art that several methods can be devised to determine BER information using the architectures illustrated in both FIGS. 9 and 12.

Figure 13:
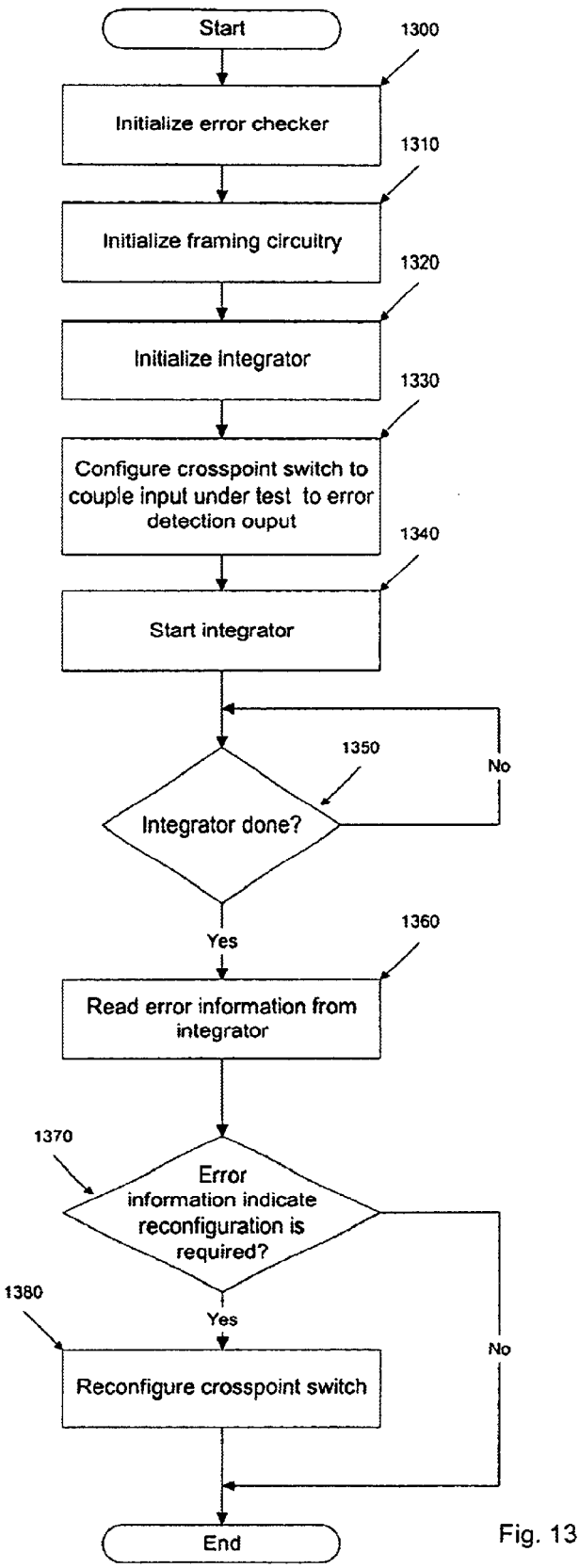
FIG. 13 illustrates a process capable of being performed by the error detection architecture of FIG. 12.

FIG. 13 offers one embodiment of such a method. The process of FIG. 13 begins with the initialization of error checker 900 (step 1300) and framing circuitry 910 (step 1310). In this process, integrator 1200 is employed, and so must be initialized (step 1330). As with the other processes described herein, crosspoint switch 810 must be configured to couple the input under test to the error detection output so that the data stream therefrom may be analyzed (step 1330). Once the circuitry has been configured, integrator 1200 is started (step 1340), and is allowed to run until its analysis process has completed (step 1350). Alternatively, a timer in microcontroller 840 may be used to control the starting and stopping of integrator 1200. Once integrator 1200 has completed processing of the data stream under test, microcontroller 840 reads the error information so generated from integrated 1200 (step 1360). Microcontroller 840 then analyzes this information to determine if the error information indicates that crosspoint switch 810 requires reconfiguration due to a failure therein (step 1370). If such is the case, microcontroller 840 reconfigures crosspoint switch 810 to address the situation (step 1380). As before, microcontroller 840 can cause other actions to be taken, including user intervention.

Figure 14:
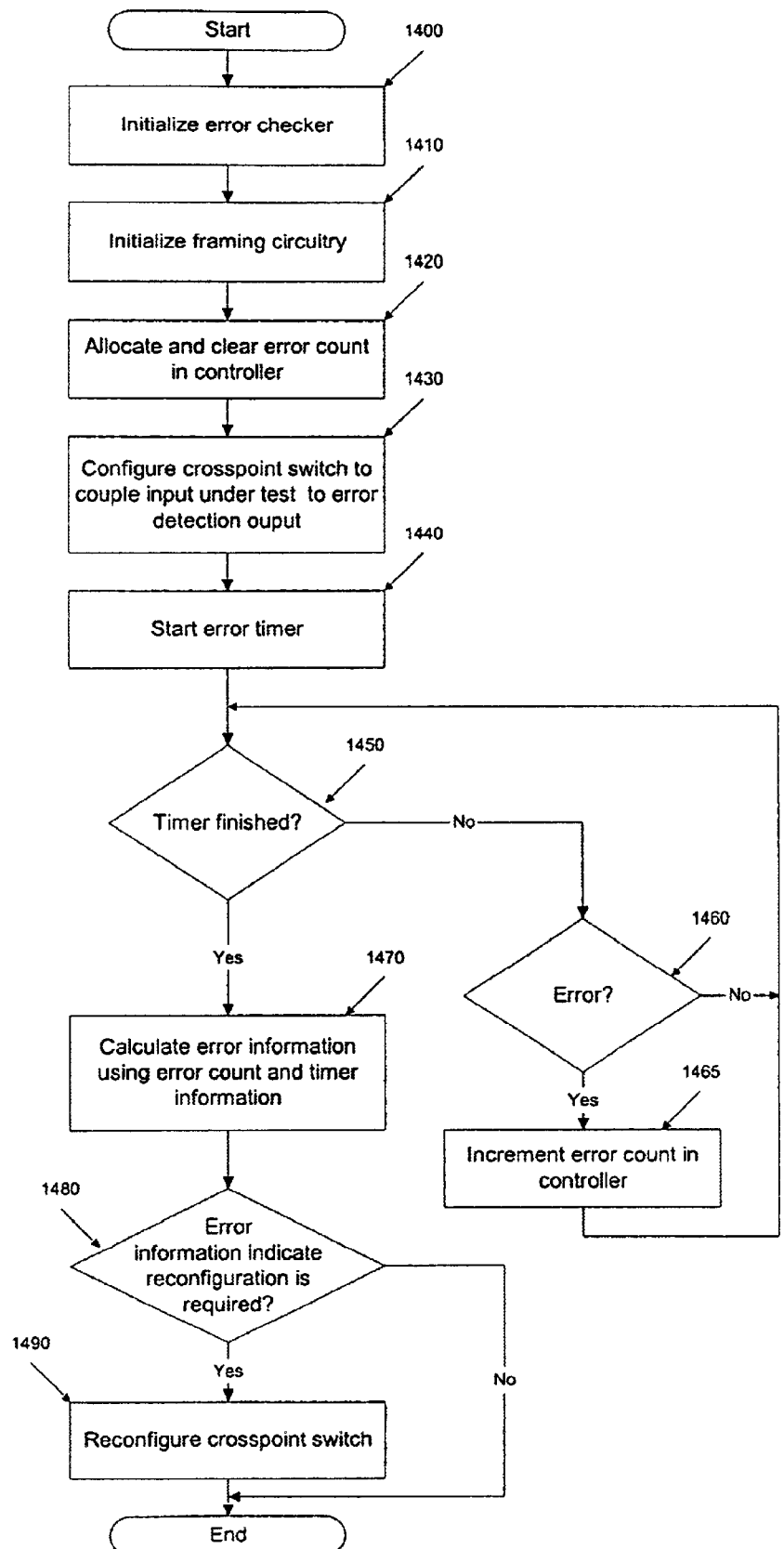
FIG. 14 illustrates another process capable of being performed by the error detection architecture of FIG. 12.

FIG. 14 illustrates an embodiment in which the BER is calculated by microcontroller 840. This process begins by once again initializing error checker 900 and framing circuitry 910 (steps 1400 and 1410). Next, a variable is defined by microcontroller 840 to hold the count of errors detected by error checker 900 and framing circuitry 910 (step 1420). Also at this point, the variable (referred to herein as the "error count") is cleared (step 1420). Again, the error count may be either cleared and subsequently incremented, or set to a desired limit and decremented. An error timer is then started to allow for the calculation BER through the integration of errors or time (step 1440). It will be noted that integrator 1200 is not necessary using the method depicted in FIG. 14, as its functionality is taken over by microcontroller 840 and the software running therein. Microcontroller 840 subsequently checks to see if the timer has reached its terminal value (step 1450). If the timer is still running, microcontroller 840 pulls error 900 an framing circuitry 910 to determine if any errors have occurred (step 1460), and increments its error count if errors are detected (step 1465). It will be noted that this portion of the process can employ polling techniques, interrupt-driven techniques, or other such techniques, as will be apparent to one of skill in the art. Once the error timer has timed out (step 1450), microcontroller 840 calculates error information using the error count and timer information (step 1470). This may be done, for example, by integrating the number of errors detected over the time in which the errors took place. If the error information indicates that a failure has occurred in crosspoint switch 810 (step 1480), crosspoint switch 810 is reconfigured by microcontroller 840 (step 1490). Again, as noted, other actions may also be taken.

It will be apparent to one skilled in the art that the various apparati and methods just described can be applied to the nodes making up a matrix (e.g., crosspoint switch 810) or an entire matrix (e.g., switching matrix 130) (or only portions thereof). Thus, in the latter case, one or more paths through switching matrix 130 can be tested on an end-to-end basis. This would be the case, for example, if a specific input data stream (and so that data stream's path through switching matrix 130) were to be tested. Alternatively, in the former case, switching nodes are tested separately. In a switching matrix employing multiple switching nodes, this allows failures to be localized within the switching matrix. This can be accomplished, for example, by sending a command to some or all of the switching node's microcontrollers (or microprocessors, as the case may be) to test one or more of their outputs.

Testing can also be performed in an ongoing manner. For example, one or more of the microprocessors can be programmed to continuously cycle through testing each one of the corresponding switching node's data paths. This can be used to support fault-tolerance techniques. Errors detected during this testing can be used to trigger several actions, including the reconfiguration of the switching matrix to reroute data streams around failed nodes (or to avoid a problematic path through a switching node), the manual re-routing of data streams, alarms, administrator intervention (e.g., the physical replacement of failed components), and the like.

Matrix Shelf Processor Module

The matrix shelf processor module provides local control and management for one of the main-matrix shelves. The matrix shelf processor communicates with the level-1 and route processors over a low speed network connection and with the matrix node cards over a multidrop, low-speed bus.

Figure 15:
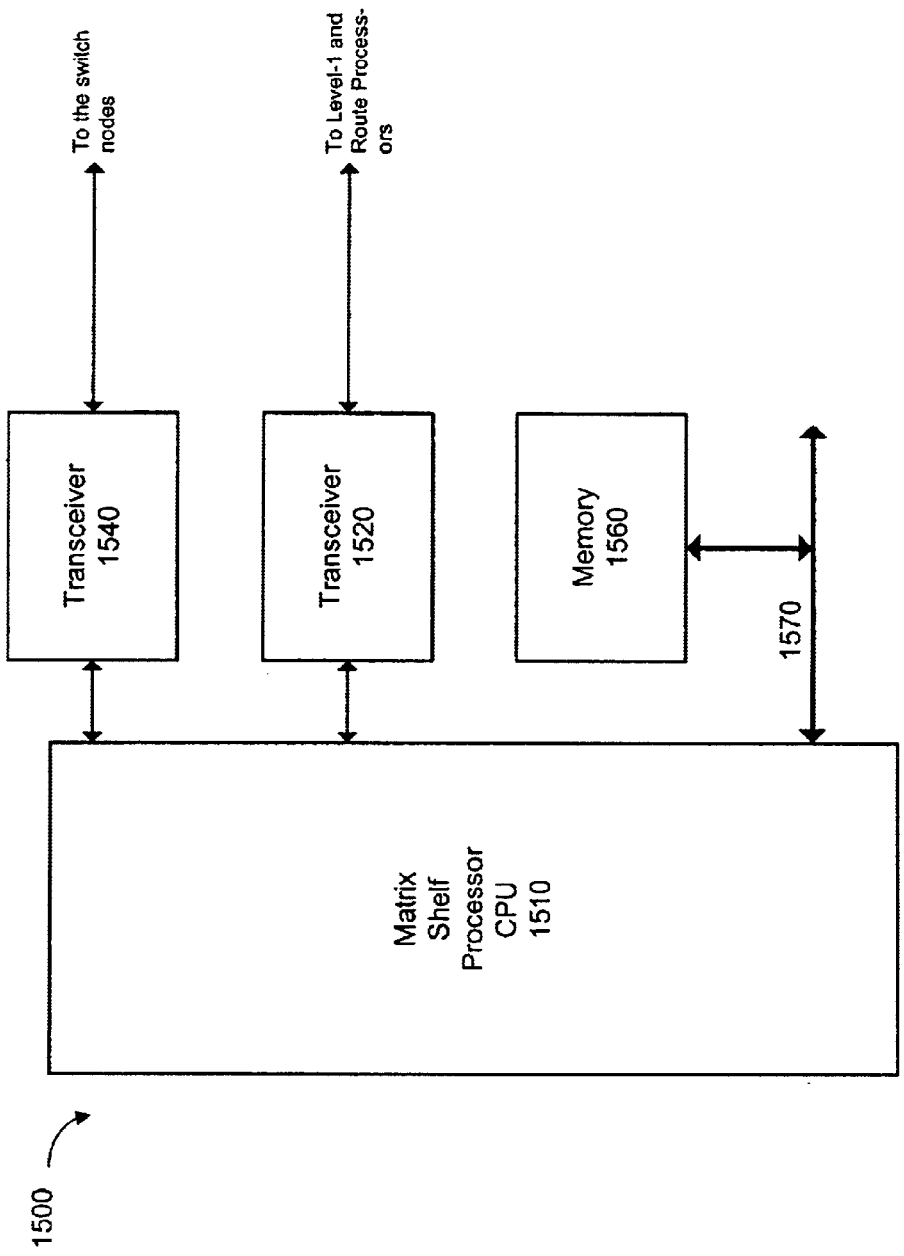
FIG. 15 illustrates a matrix shelf processor.

FIG. 15 illustrates a matrix shelf processor 1500, which is illustrative of a matrix shelf processors and shelf processor 600 of FIG. 6. Matrix shelf processor 1500 provides local control and management for one of the shelves of a main matrix such as switching matrix 130 (FIG. 1). The core of matrix shelf processor 1500 is a matrix shelf processor CPU 1510. Matrix shelf processor CPU 1510 communicates with one or more level-1 processors (not shown) and route processors (not shown) via a transceiver 1520 (preferably a 10BASE-T transceiver). Matrix shelf processor CPU 1510 communicates with the system switches (i.e., system switches 340 and 341) via a transceiver 1540. To support these functions, matrix shelf processor CPU 1510 is coupled via a processor bus 1570 to memory 1560 which provides storage for various software modules run by matrix shelf processor CPU 1510.

Management Bay

The management bay can house, for example, the following modules:

1. Level-1 processors, or system controllers, and their associated storage devices;
2. Route processors;
3. Optional group and WAN cards;
4. System Ethernet switches; and
5. Synchronization modules.

All of the above modules are fully redundant and communicate with the rest of router 100 over redundant control buses. The placement of individual modules within the rack is not addressed in this document, since there are no architectural preferences, or restrictions, on such choices.

Level-1 Processor/System Controller

Figure 16:
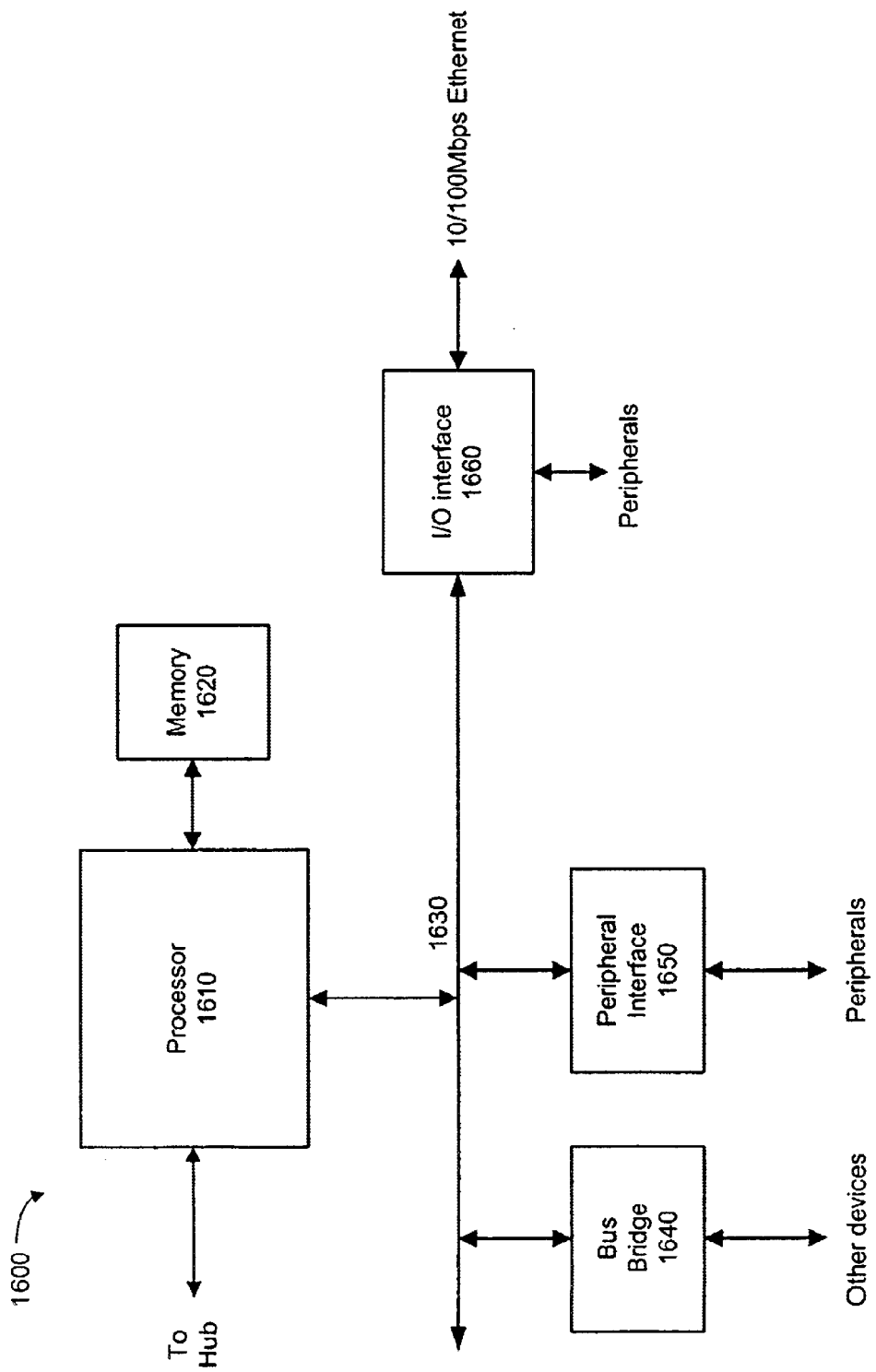
FIG. 16 illustrates a system controller.

FIG. 16 illustrates a system controller 1600 (also referred to herein as a level-1 processor). The core of the system controller 1600 is a processor 1610, which also communicates with the system switches (i.e. system switches 340 and 341). Programs run on processor 1610 are stored in memory 1620 coupled thereto. Processor 1610 is also coupled to an all-purpose bus (APB) 1630, which in turn drives several bus and communications controllers. Among the controllers interfaced to APB 1630 is a bus bridge 1640, a peripheral interface 1650, and an I/O interface 1660. I/O interface 1660 may provide functionality such as 10 Mbps/100 Mbps Ethernet communications. I/O interface 1660 also supports peripherals such as keyboards, mice, floppy drives, parallel ports, serial ports, and the like. Bus bridge 1640 allows communications between processor 1610 and other devices. Peripheral interface 1650 allows communications with peripherals such as hard disks. The level 1 processor performs various functions, such as communicating with the route processor(s) to determine how the matrix should be configured, managing the router's resources, and similar duties.

APB 1630 may also be connected to a dual-channel serial communication controller (SCC), which is used to communicate with one or more remote Operations Systems (OS) using, for example, the X.25 protocol. For more OS links and higher link speeds, the user can optionally install one or more WAN Interface Modules in the management bay. Such modules, which preferably handle all real-time aspects of the OS link, including layer-2 of the OSI stack, communicate with the level-1 processor.

Route Processor Module

Figure 17:
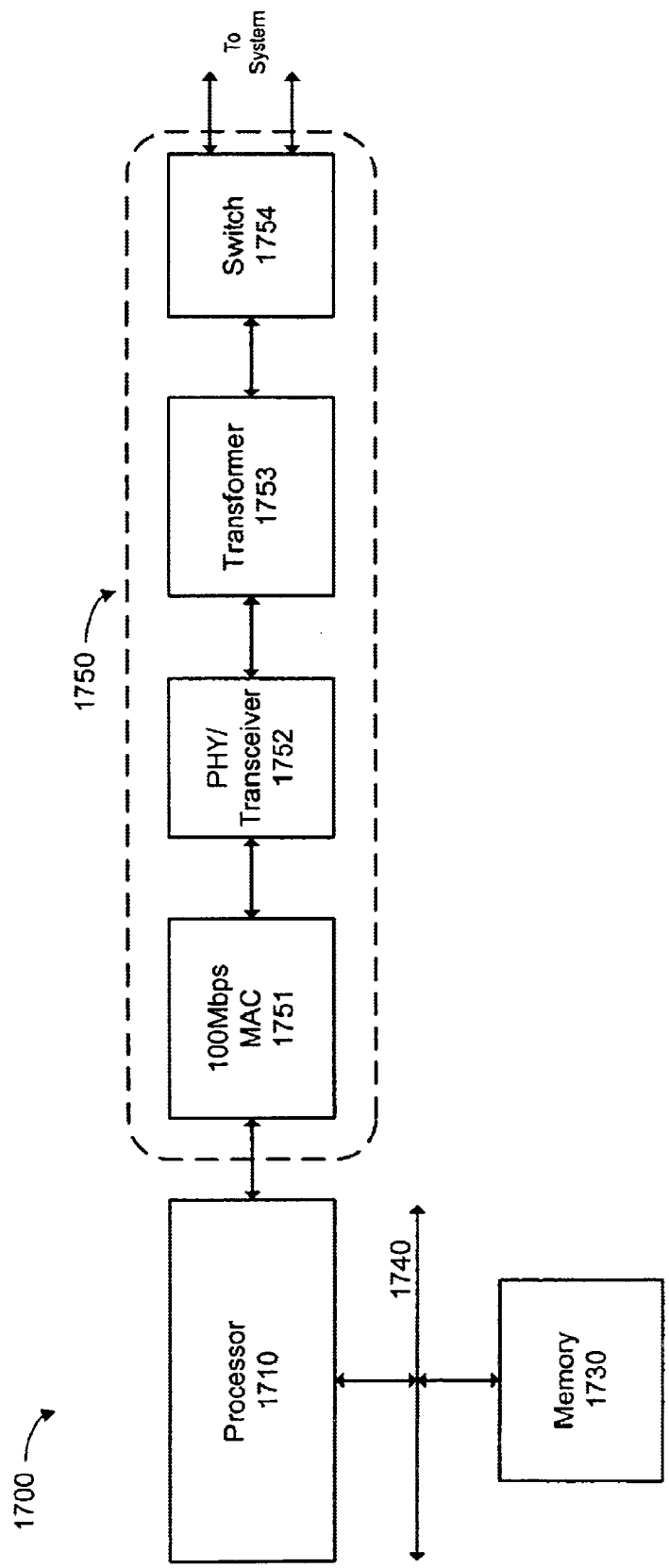
FIG. 17 illustrates a route processor.

FIG. 17 illustrates a route processor 1700. Route processor 1700 is a high-speed processor subsystem with relatively limited I/O capabilities. Route processor 1700 functions to receive link-failure indications from the line cards (not shown), computes an alternate route for failed connections using a restoration protocol such as that described in the co-pending application entitled "A METHOD FOR ROUTING INFORMATION OVER A NETWORK" and previously included by reference herein, and then sends one or more configuration requests to all affected nodes to achieve this new routing. Route processor 1700 is able to communicate directly with all system modules, including the line cards (not shown) and the matrix shelf processors (not shown) via a redundant high speed network connection to the system switch. In systems using Ethernet as the communication mechanism, route processor 1700 communicates with these elements via a redundant 100 Mbps connection to the system Ethernet switch. The core of route processor 1700 is a processor 1710 which runs software stored in memory 1730 via a CPU bus 1740. As noted, the software implements a routing protocol such as that mentioned above. Processor 1710 communicates with other systems of router 100 using an Ethernet communications mechanism via a 100 Mbps Ethernet transceiver 1750. Ethernet transceiver 1750 is depicted in FIG. 17 as including a 100 Mbps MAC 1151, a PHY/transceiver 1752, a transformer 1753 and a switch 1754. Switch 1754 provides a redundant connection to the other systems of router 100 to allow uninterrupted operation in the event of a communications failure.

System Switch

Figure 18:
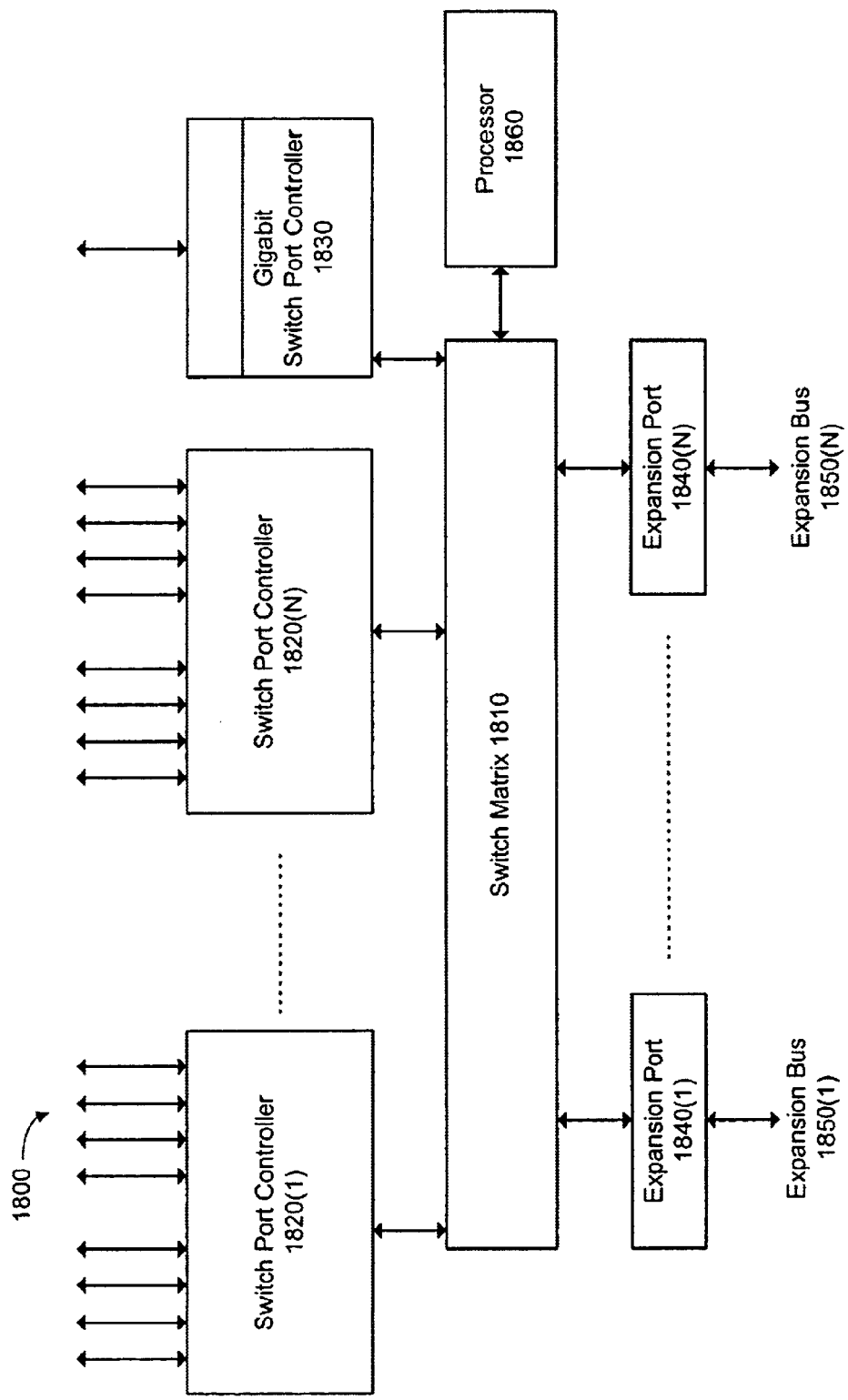
FIG. 18 illustrates an example of a system switch.

FIG. 18 illustrates an example of a system switch depicted as a system switch 1800, which can use an Ethernet-based communications, for example. In an Ethernet configuration, system switch 1800 manages the Ethernet connections from all level-1, level-2, route, and optional Wide Area Network (WAN) processors (not shown). System switch 1800 implements a high-speed, low-latency Ethernet switch that isolates local traffic to individual segments. The core of system switch 1800 is a switch matrix 1810. In one embodiment, switch matrix 1810 is an eight port bus that interconnects switch port controllers 1820(1)-(N), one or more high-speed interfaces (exemplified by a gigabit Ethernet switch port controller 1830), and expansion ports 1840(1)-(N). Each one of expansion ports 1840(1)-(N) communicates with a corresponding one of expansion buses 1850(1)-(N), respectively. Switch matrix 1810 is controlled by a processor 1860. Each copy of system Ethernet switch 1800 thus supports communications with level-1 processors, route processors, each I/O bay, and each matrix shelf processor. In Ethernet-based systems, these connections may be by 100 Mbps or 10 Mbps connections.

Software Architecture

In one embodiment, router 100 implements many functions in software to provide flexibility, support for communications protocols, and ease of implementation. The software architecture presented here forms a distributed management, control, and routing layer capable of spanning hundreds or thousands of nodes. The software architecture covers all protocol layers, management and control applications, and inter-node communication protocols and APIs.

The software modules described herein may be received by the various hardware modules of router 100, for example, from one or more computer readable media. The computer readable media may be permanently, removably or remotely coupled to the given hardware module. The computer readable media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, etc.; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Overall Architecture

The software running the various processors of router 100 normally includes three major components: operating system, inter-processor and inter-node communications, and management and control applications. The operating system should provide standard facilities for supporting program operation, communications, and system management tasks.

An important aspect of any software architecture is its underlying inter-process communications (IPC) mechanism. IPCs that provide for the isolation of tasks are preferable. Such IPCs use message passing as their preferred communication. Message passing allows for full, but isolated interaction among tasks. To the rest of the system, a task, no matter how complex, is reduced to a simple producer and consumer of messages. An IPC mechanism provides a set of well defined services, each accessed through one or more messages. Though sometimes visible to other tasks, in one embodiment, none of a given task's variables and structures should be accessible outside its context. Limiting task interactions to message passing and keeping runtime variables private to each task allows individual software components to evolve independently and in parallel.

In order to keep code generic (i.e., system-and processor-independent), the message-based IPC should also provide a consistent application programming interface (API) that doesn't rely on any system-specific features or attributes. The API should have the same syntax and behavior, regardless of the underlying operating system, processor, or message-passing mechanism used. With certain generating systems, for example, message queues are used to implement the IPC, while on other kernels, pipes might be more appropriate. Preferably, then, the API should provide the following services to the application code:

1. Send message;
2. Receive a message;
3. Check for available messages; and
4. Name lookup and registration.

The last service, name lookup and registration, makes it possible for communicating entities to reference one another using names rather than task ID's, which are system-dependent.

Resource Manager

A resource manager (RM) is the software module responsible for collecting information about available resources and monitoring their status during normal system operation. A resource is used generically in this document to refer to any manageable hardware element that performs one or more system functions. The RM builds its resource list from unsolicited information the RM receives from other modules in the system, and from periodic keep-alive messages the RM exchanges with those modules. The RM, for example, is the first system application notified of card failures, insertions, and removals.

In one embodiment of router 100, there are two RM versions in the system. The first, which runs on the level-1 processor, is responsible for managing system resources and, in some cases, network-wide resources. The other version, which runs on level-2 processors, is responsible for managing resources in a single shelf. This multi-level hierarchy creates a flexible and expandable system where lower-level resource managers are custom designed for the specific shelf controlled.

The RM maintains information about a given resource in a structure called the Resource Control Block (RCB). The RCB consists of two main sections: a generic section, which is the sane for all resources regardless of type, and a resource-specific section that varies according to resource type. All resource managers maintain a hierarchical list of resource control blocks that represents resources under their control. The list is referred to herein as the resource list and reflects the resources' hierarchy and their interdependencies. This allows the RM to determine, relatively quickly, the effect a given resource's failure has on other members of the hierarchy.

The router 100 preferably runs one or more versions of the Unix operating system on the level-1 processor and the level-2 processors (in the I/O and matrix shelves). Level-2 processors preferably run a real-time version of the Unix operating system (OS). Other processors (e.g., level-3, route, quad, and matrix-node processors) preferably run a single task that does not require the services of an operating system or kernel. While Unix operating systems are described herein as being preferable, any one or a number of operating systems may be used.

System Controller

The system controller is responsible for overall system management and control. The system controller uses a variety of protocols to communicate with other nodes in the network, including the operating system (OS). Some of the protocols satisfy specific requirements (e.g. in a SONET based system, the transfer of OAM&P message across the SONET/SDH communications channels DCC), while others implement features, or functions, that are not part of the physical protocol used. To facilitate these functions, every router (one router, two, etc.) in a network is assigned an ID that uniquely identifies the given router within the network. The ID can also serve as a priority metric that determines the node's level within the hierarchy. However, the network can be configured to allow the user to override this by manually assigning priorities to network nodes. The system controller supports a number of tasks that perform management, control, and routing functions, including resource management, OS interfacing, various network protocol servers, and operations, control, and intermediate system services.

Matrix Shelf Processor

The matrix shelf processor is responsible for the overall operation of a single main matrix shelf. The matrix processor communicates with the system controller, the route processor, and the microcontroller on each of the switch nodes, to provide local control and management for the shelf, including matrix configuration, diagnostics, and error reporting. The software on the matrix shelf processor preferably runs under a real-time Unix operating system. The RM on the matrix shelf processor is responsible for managing the hardware resources in its shelf. Like other resource managers in the system, the level-2 manager on this module uses a combination of hardware and software to discover and maintain a list of available shelf resources. A protocol may be implemented to support such messaging.

In one embodiment, fault isolation is implemented by a dedicated task that is responsible for locating failures within the shelf. In a SONET based implementation, the software running on the shelf processor, with help from the microcontroller on the switch node, to determine(s) the quality of any of the input signals.

Failure Isolation

Fault isolation may be implemented, for example, by a dedicated task that is responsible for locating failures within the shelf. The software running on the shelf processor, with help from the microcontroller on the switch node, is able to determine input signal quality.

Figure 19:
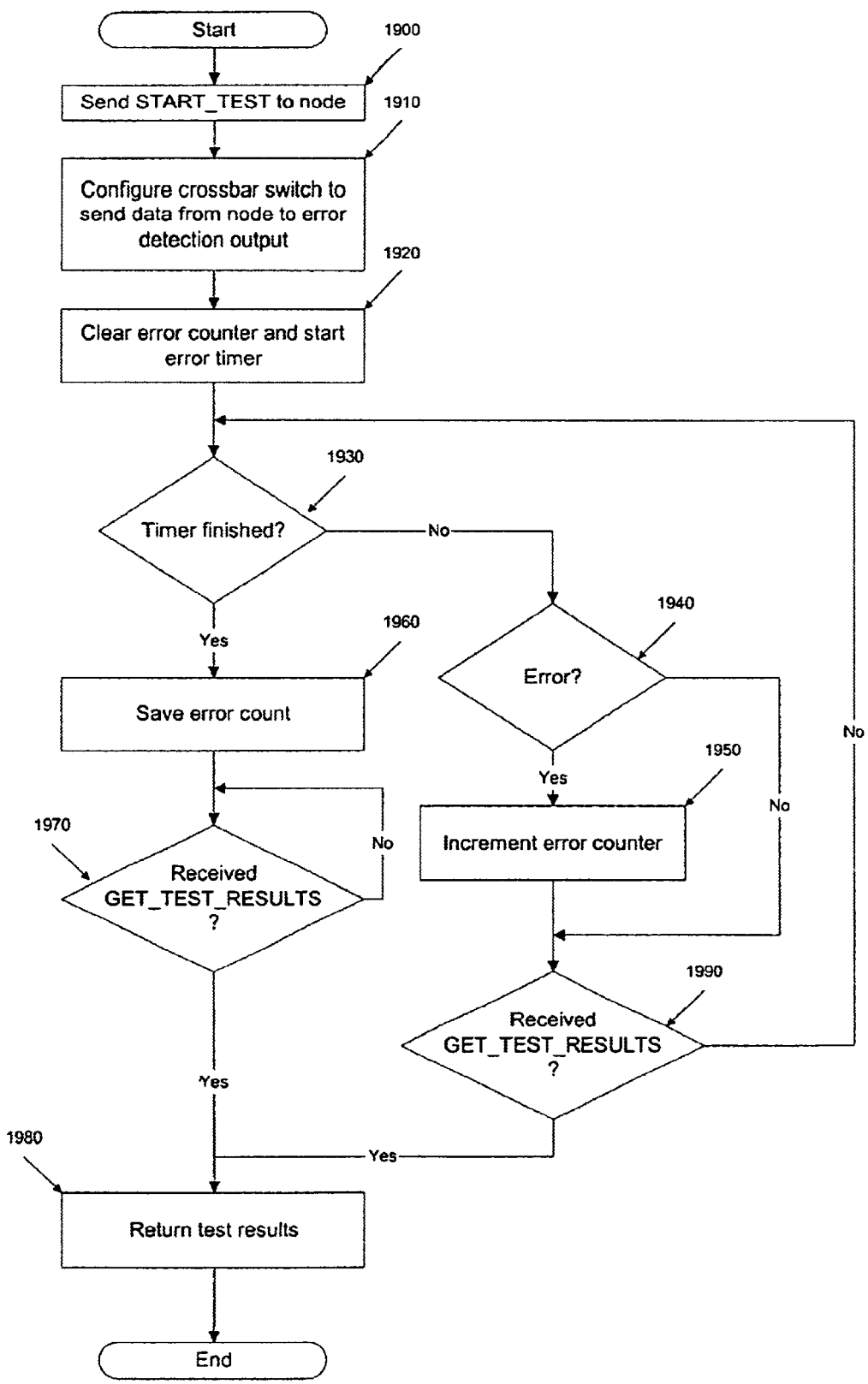
FIG. 19 illustrates the actions taken by the failure-isolation task in isolating and identifying a failure.

FIG. 19 illustrates exemplary actions taken by the failure-isolation task in isolating and identifying a failure. The failure-isolation task first sends a START_TEST message to the proper switch node card (step 1900). The message carries information such as the input port number and the length of the test in seconds. The microcontroller on the target card then configures the switch matrix so that data from the specified input port is copied onto the spare output port (e.g., the fault detection port, depicted as switch output 822(17) in FIG. 8), in addition to the designated output port (step 1910). The step should not cause any errors on any of the existing connections, including the one being tested. This is made possible by the architecture of switch matrix 130, which allows any of its inputs to be connected to any (or all) of its outputs.

As described, in one embodiment, the microcontroller then clears the error counter and starts a timer that expires at the end of the specified period (step 1920). Errors are reported by the physical layer monitor using a dedicated interrupt line (step 1940). The interrupt handler increments an error counter every time an interrupt is received from the monitor (step 1950).

At the end of the test period, which is indicated by the expiration of the timer, the microcontroller disables the physical layer monitor interrupt and saves the contents of the error counter (step 1960). When a GET_TEST_RESULT message is received from the shelf processor (step 1970), the microcontroller returns the result of the test in the response message (step 1980). If the GET_TEST_RESULT is received before the timer has expired, the microcontroller stops the timer and performs the sequence (step 1990).

I/O Shelf Processor

Line Card

The I/O Module terminates an input signal from one of the other nodes in the network. For example, in a SONET-based implementation, a single SONET/SDH OC-48 signal is terminated by an I/O module, although other signal levels (OC-192, OC-12, and so on) may be supported. In one embodiment, the software consists of two threads, one that runs in the background and is responsible for non-time critical tasks. The other thread, which runs at the interrupt level, is responsible for all real-time aspects of the software, including limited overhead processing, alarm detection and forwarding, and fault detection and recovery. The I/O module maintains a copy eof its firmware and startup code onboard.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A signal router comprising:
   a first switching matrix, wherein said first switching matrix has a first number of inputs and a second number of outputs;
   an error detector, coupled to one of said second number of outputs and selectable coupled to one of the first number of inputs, and configured to generate error information by virtue of being configured to detect errors in an information stream; and
   a controller, coupled to said first switching matrix and said error detector, wherein said controller is configured to
   select one of said first number of inputs from said first number of inputs,
   receive error information from said error detector, and
   configure said first switching matrix to couple said one of said first number of inputs to said one of said second number of outputs, and
   said first switching matrix is configured to receive said information stream at said one of said first number of inputs.

2. The signal router of claim 1, further comprising:
   a plurality of switching matrices, wherein
   said first switching matrix is one of said plurality of switching matrices,
   said first switching matrix is configured to identify said first switching matrix by virtue of said error information generated by said error detector.

3. The signal router of claim 2, further comprising:
   a plurality of error detectors, wherein
   each one of said plurality of switching matrices is coupled to a corresponding one of said plurality of error detectors at one output of a plurality of outputs of said plurality of switching matrices,
   said first switching matrix is configured to identify at least one of said plurality of switching matrices by virtue of said error information generated by a corresponding one of said plurality of error detectors, and
   said at least one of said plurality of switching matrices experiences a failure detected by said corresponding one of said plurality of error detectors.

4. The signal router of claim 1, wherein said controller is further configured to reconfigure said first switching matrix in response to said error information.

5. The signal router of claim 1, wherein said controller further configures said first switching matrix to couple said one of said first number of inputs to another of said second number of outputs in addition to said one of said second number of outputs.

6. The signal router of claim 1, further comprising:
a plurality of receivers, each one of said plurality of receivers coupled to a corresponding one of said first number of inputs and including a receiver error detector configured to detect errors in a received information stream; and
a plurality of transmitters, each one of said plurality of transmitters coupled to a corresponding one of said second number of outputs and including a transmitter error detector configured to detect errors in an information stream to be transmitted, wherein said error detector further localizes a source of said errors by virtue of being configured to detect errors occurring after said receiver error detector of said each one of said plurality of receivers and before said transmitter error detector of said each one of said plurality of transmitters.

7. The signal router of claim 6, wherein said each one of said plurality of receivers is an optical receiver and said each one of said plurality of transmitters is an optical transmitter.

8. The signal router of claim 1, further comprising:
a clock and data recovery unit coupled between said one of said second number of outputs and said error detector; and
a demultiplexer coupled between said clock and data recovery unit and said error detector.

9. The signal router of claim 8, wherein said clock and data recovery unit comprises a phase-locked loop.

10. The signal router of claim 1, wherein said information stream comprises a plurality of frames and said error detector comprises:
an error checker, coupled to said first switching matrix and said controller, wherein
said error checker is configured to generate error check information, and
said error check information is included in said error information; and
a framing circuit, coupled to said first switching matrix, said controller, and said error checker, and configured to
detect a start-of-frame condition for each one of said plurality of frames,
indicate said start-of-frame condition to said error checker,
detect an end-of-frame condition for each one of said plurality of frames,
indicate said end-of-frame condition to said error checker, and
detect framing error, said framing error included in said error information.

11. The signal router of claim 10, wherein said framing error is an error in a set of errors that includes a loss-of-frame error, an out-of-frame error, and a loss-of-signal error.

12. The signal router of claim 10, said error detector further comprising:
an integrator, coupled between said error checker and said controller, and coupled between said framing circuit and said controller, wherein
said integrator is configured to determine an error rate, said error rate is determined by counting said occurrence of said error during a period of time, and
said error information comprises said error rate.

13. The signal router of claim 10, wherein:
said error checker and said framing circuit are coupled to an error counter,
said error counter is configured to maintain an error count by virtue of being configured to count an occurrence of an error detected by at least one of said error checker and said framing circuit,
said controller is configured to reset said error counter, periodically read an error count from said error counter, and calculate an error rate based on said error count, said error information comprising said error count.

14. The signal router of claim 13, wherein:
said error detector further comprises an error limit register and a comparator,
said comparator is coupled to said error counter and said error limit register,
said controller is further configured to load an error limit into said error limit register, and periodically read said error count from and reset said error counter in response to a signal generated by said error detector,
said signal is generated by said comparator when said error count is equal to said error limit.

15. The signal router of claim 10, wherein:
said error checker and said framing circuit are coupled to an error counter,
said error counter is configured to
maintain an error count by virtue of being configured to count an occurrence of an error detected by at least one of said error checker and said framing circuit, and
reset said error count upon said error count being read,
said controller is configured to periodically read an error count from said error counter, and calculate an error rate based on said error count, said error information comprising said error count.

16. The signal router of claim 15, wherein:
said error detector further comprises an error limit register and a comparator,
said comparator is coupled to said error counter and said error limit register,
said controller is further configured to load an error limit into said error limit register, and periodically read said error count from said error counter in response to a signal generated by said error detector,
said signal is generated by said comparator when said error count is equal to said error limit.

17. The signal router of claim 10, wherein said information stream is a SONET stream and each one of said plurality of frames is in a SONET frame format.

18. The signal router of claim 10, wherein said error checker is a parity checker.

19. The signal router of claim 10, wherein
each one of said plurality of frames contains an error check entry, and
said error checker generates said error check information by analyzing one of said plurality of frames and comparing a result of said analyzing to an error check entry of another of said plurality of frames.

20. An error detection method comprising:
sending a first command to a controller, said controller coupled to control a switching matrix and to an error detector, said command causing said controller to configure said switching matrix to selectably couple one of a plurality of inputs to one of a plurality of outputs, said one of said plurality of inputs configured to receive an information stream and said one of said plurality of outputs coupled to said error detector, wherein said one of said plurality of outputs is less than all of said plurality of outputs;
generating error information by detecting errors, if any, in said information stream using said error detector; and retrieving said error information from said error detector using said controller.

21. The method of claim 20, wherein said controller configures said switching matrix to couple said one of said plurality of inputs to another of said plurality of outputs in addition to said one of said plurality of outputs.

22. The method of claim 20, wherein said generating error information comprises:

clearing an error counter of said error detector;

starting an error timer; and until said error timer reaches a terminal value, incrementing said error counter each time an error is detected by said error detector.

23. The method of claim 20, wherein said information stream comprises a plurality of frames and said detecting errors comprises:

generating a framing error if a framing circuit of said error detector detects an error in framing in said information stream, wherein said framing circuit is coupled to and provides framing information to an error checker of said error detector;

if no said error in framing is detected, generating a check error for each erroneous frame of said plurality of frames that is processed by said error detector, said error checker detecting an error in said erroneous frame.

24. The method of claim 23, wherein each one of said plurality of frames is a SONET frame and said framing error is an error in a set of errors that includes a loss-of-frame error, an out-of-frame error, and a loss-of-signal error.

25. The method of claim 23, wherein said error checker is a parity checker and said check error is a parity error.

26. The method of claim 25, wherein:

said plurality of frames are received by said error detector in a sequence, said error checker generates parity information for a currently-processed frame of said plurality of frames, said currently-processed frame at a position in said sequence, and said error checker compares said parity information to a parity entry in another of said plurality of frames.

27. The method of claim 26, wherein each one of said plurality of frames is a SONET frame, said parity entry is a B1 byte of said SONET frame, and said another of said plurality of frames is at another position in said sequence, said another position in said sequence immediately subsequent to said position in said sequence.

28. A failure detection method comprising:

sending a command to a plurality of controllers, wherein each one of said controllers is coupled to control a corresponding one of a plurality of switching matrices, said each one of said controllers is coupled to control a corresponding one of a plurality of error detectors, each one of said switching matrices is coupled to at least one other of said switching matrices, said command causes said controller to configure said corresponding one of said switching matrices to selectably couple one of a plurality of inputs of said corresponding one of said switching matrices to one of a plurality of outputs of said corresponding one of said switching matrices, and said one of said inputs is configured to receive an information stream and said one of said outputs is configured to output said information stream by virtue of being coupled to said one of said inputs;

generating error information corresponding to said information stream by detecting errors, if any, in said information stream using said one of the plurality of error detectors, wherein said one of the plurality of error detectors is coupled to said one of the plurality of outputs of said corresponding one of said switching matrices; and identifying failed ones of said switching matrices by retrieving said error information corresponding to each one of said switching matrices.

29. The method of claim 28, wherein each one of a plurality of outputs of a first plurality of said switching matrices are coupled to a corresponding one of a plurality of inputs of a second plurality of said switching matrices.

30. The method of claim 28, wherein each one of said controllers configures said corresponding one of said switching matrices to couple said one of said inputs to another of said outputs in addition to said one of said outputs.

31. The method of claim 28, wherein said generating error information comprises:

clearing an error counter of said corresponding one of said error detectors;

starting an error timer in said one of said controllers; and until said error timer in said one of said controllers reaches a terminal value, incrementing said error counter each time an error is detected by said corresponding one of said error detectors.

32. The method of claim 28, wherein said information stream comprises a plurality of frames and said detecting errors comprises:

generating a framing error if a framing circuit of said corresponding one of said error detectors detects an error in framing in said information stream, wherein said framing circuit is coupled to and provides framing information to an error checker of said corresponding one of said error detectors; and if no said error in framing is detected, generating a check error for each erroneous frame of said plurality of frames that is processed by said error detector, said error checker detecting an error in said erroneous frame.

33. A signal router comprising:

a switching matrix, wherein said switching matrix has a first number of inputs and a second number of outputs;

an error detector, coupled to one of said second number of outputs and configured to generate error information by virtue of being configured to detect errors in an information stream; and a controller, coupled to said switching matrix and said error detector, wherein said controller is configured to select one of said first number of inputs from said first number of inputs, receive error information from said error detector, and configure said switching matrix to couple said one of said first number of inputs to said one of said second number of outputs, and said switching matrix is configured to receive said information stream at said one of said first number of inputs;

wherein said information stream comprises a plurality of frames and said error detector comprises:

an error checker, coupled to said switching matrix and said controller, wherein said error checker is configured to generate error check information, and said error check information is included in said error information;

a framing circuit, coupled to said switching matrix, said controller, and said error checker, and configured to detect a start-of-frame condition for each one of said plurality of frames, indicate said start-of-frame condition to said error checker, detect an end-of-frame condition for each one of said plurality of frames, indicate said end-of-frame condition to said error checker, and detect framing error, said framing error included in said error information;

an integrator, coupled between said error checker and said controller, and coupled between said framing circuit and said controller, wherein said integrator is configured to determine an error rate, said error rate is determined by counting said occurrence of said error during a period of time, and said error information comprises said error rate.

34. The signal router of claim 33, wherein:

said error checker and said framing circuit are coupled to an error counter, said error counter is configured to maintain an error count by virtue of being configured to count an occurrence of an error detected by at least one of said error checker and said framing circuit, said controller is configured to reset said error counter, periodically read an error count from said error counter, and calculate an error rate based on said error count, said error information comprising said error count.

35. The signal router of claim 34, wherein:

said error detector further comprises an error limit register and a comparator, said comparator is coupled to said error counter and said error limit register, said controller is further configured to load an error limit into said error limit register, and periodically read said error count from and reset said error counter in response to a signal generated by said error detector, said signal is generated by said comparator when said error count is equal to said error limit.

36. A signal router comprising:

a switching matrix, wherein said switching matrix has a first number of inputs and a second number of outputs;

an error detector, coupled to one of said second number of outputs and configured to generate error information by virtue of being configured to detect errors in an information stream; and a controller, coupled to said switching matrix and said error detector, wherein said controller is configured to select one of said first number of inputs from said first number of inputs, receive error information from said error detector, and configure said switching matrix to couple said one of said first number of inputs to said one of said second number of outputs, and said switching matrix is configured to receive said information stream at said one of said first number of inputs;

wherein said information stream comprises a plurality of frames and said error detector comprises:

an error checker, coupled to said switching matrix and said controller, wherein said error checker is configured to generate error check information, and said error check information is included in said error information; and a framing circuit, coupled to said switching matrix, said controller, and said error checker, and configured to detect a start-of-frame condition for each one of said plurality of frames, indicate said start-of-frame condition to said error checker, detect an end-of-frame condition for each one of said plurality of frames, indicate said end-of-frame condition to said error checker, and detect framing error, said framing error included in said error information;

said error checker and said framing circuit are coupled to an error counter, said error counter is configured to maintain an error count by virtue of being configured to count an occurrence of an error detected by at least one of said error checker and said framing circuit, and reset said error count upon said error count being read, said controller is configured to periodically read an error count from said error counter, and calculate an error rate based on said error count, said error information comprising said error count.

37. The signal router of claim 36, wherein:

said error detector further comprises an error limit register and a comparator, said comparator is coupled to said error counter and said error limit register, said controller is further configured to load an error limit into said error limit register, and periodically read said error count from said error counter in response to a signal generated by said error detector, said signal is generated by said comparator when said error count is equal to said error limit.

38. The signal router of claim 5, wherein said one of said second number of outputs provides the information stream to said error detector but is not a source of the information stream as an output of a switch node comprising the switching matrix; and said another of said second number of outputs is the source of the information stream as the output of the switch node.

* * * * *